(12) United States Patent
Sharma et al.

(10) Patent No.: US 10,065,120 B2
(45) Date of Patent: Sep. 4, 2018

(54) VIDEO VIEWING AND TAGGING SYSTEM

(71) Applicant: Microsoft Technology Licensing, LLC, Redmond, WA (US)

(72) Inventors: Pallaw Sharma, Seattle, WA (US); Warwick Holder, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 303 days.

(21) Appl. No.: 14/970,281

(22) Filed: Dec. 15, 2015

(65) Prior Publication Data

US 2016/0096112 A1   Apr. 7, 2016

Related U.S. Application Data

(63) Continuation of application No. 13/074,832, filed on Mar. 29, 2011, now Pat. No. 9,251,503.

(60) Provisional application No. 61/409,017, filed on Nov. 1, 2010.

(51) Int. Cl.
| | |
|---|---|
| *G06F 3/0481* | (2013.01) |
| *A63F 13/847* | (2014.01) |
| *G11B 27/34* | (2006.01) |
| *G06Q 10/10* | (2012.01) |
| *A63F 13/23* | (2014.01) |

(52) U.S. Cl.
CPC ............ *A63F 13/847* (2014.09); *A63F 13/23* (2014.09); *G06F 3/0481* (2013.01); *G06Q 10/101* (2013.01); *G11B 27/34* (2013.01)

(58) Field of Classification Search
CPC ..... G06F 3/0481; G06Q 10/101; A63F 13/12; A63F 13/23; A63F 13/847
See application file for complete search history.

(56) References Cited

U.S. PATENT DOCUMENTS

| | | | |
|---|---|---|---|
| 5,778,135 A | 7/1998 | Ottesen | |
| 6,138,139 A * | 10/2000 | Beck | G06Q 10/06 709/202 |
| 6,347,332 B1 * | 2/2002 | Malet | G06F 17/30867 707/E17.109 |
| 6,690,914 B2 * | 2/2004 | Ramachandran | G06N 5/043 434/118 |
| 6,931,365 B1 * | 8/2005 | Mehta | G06Q 10/06 703/1 |
| 7,121,830 B1 * | 10/2006 | Kaplan | G06Q 10/06398 434/219 |
| 7,234,117 B2 * | 6/2007 | Zaner | G06F 3/0481 715/751 |

(Continued)

OTHER PUBLICATIONS

Microsoft Research, Oct. 25, 2010.

(Continued)

*Primary Examiner* — Phenuel Salomon

(57) ABSTRACT

Systems and methods are provided to view, manipulate, and share videos within a gaming platform implemented as an advisory services network. Within the context of a serious game designed around a complex business problem of an organization, players can review videos conveying ethnographic information, mark segments of the videos, tag the videos or segments for categorization, create discussions around the videos or segments, add the videos or segments as evidence to a dossier, embed the videos or segments into existing discussions, or the like.

14 Claims, 26 Drawing Sheets

(56) References Cited

U.S. PATENT DOCUMENTS

| | | | |
|---|---|---|---|
| 7,496,623 B2 | 2/2009 | Szeto et al. | |
| 7,587,462 B2 | 9/2009 | Zmudzinski et al. | |
| 7,870,216 B2 | 1/2011 | Patron et al. | |
| 7,933,956 B2* | 4/2011 | Hon | G06F 17/30058 |
| | | | 709/205 |
| 7,945,625 B2 | 5/2011 | Sapek | |
| 7,956,890 B2 | 6/2011 | Cheng et al. | |
| 7,962,555 B2 | 6/2011 | Sastry et al. | |
| 8,275,832 B2 | 9/2012 | Chen et al. | |
| 8,312,500 B2 | 11/2012 | Emerson et al. | |
| 2002/0065678 A1 | 5/2002 | Peliotis | |
| 2002/0076674 A1* | 6/2002 | Kaplan | G06Q 10/10 |
| | | | 434/107 |
| 2002/0085030 A1* | 7/2002 | Ghani | G06Q 10/10 |
| | | | 715/751 |
| 2002/0093496 A1 | 7/2002 | Gould | |
| 2003/0027121 A1 | 2/2003 | Grudnitski et al. | |
| 2003/0078972 A1 | 4/2003 | Tapissier et al. | |
| 2004/0205107 A1 | 10/2004 | Yoon | |
| 2004/0212637 A1 | 10/2004 | Varghese | |
| 2005/0262542 A1 | 11/2005 | DeWeese et al. | |
| 2006/0010222 A1* | 1/2006 | Cleron | G06Q 10/107 |
| | | | 709/206 |
| 2006/0112344 A1 | 5/2006 | Ducheneaut | |
| 2006/0140169 A1 | 6/2006 | Soundararajan | |
| 2006/0239648 A1 | 10/2006 | Varghese | |
| 2007/0020604 A1 | 1/2007 | Chulet | |
| 2007/0281772 A1* | 12/2007 | Gwaltney | A63F 13/12 |
| | | | 463/9 |
| 2008/0046925 A1 | 2/2008 | Lee | |
| 2008/0082607 A1 | 4/2008 | Sastry et al. | |
| 2008/0172464 A1* | 7/2008 | Thattai | G06Q 10/109 |
| | | | 709/205 |
| 2008/0184122 A1 | 7/2008 | Grant et al. | |
| 2008/0228749 A1 | 9/2008 | Brown | |
| 2008/0232765 A1 | 9/2008 | Patten | |
| 2009/0019078 A1 | 1/2009 | Chisholm et al. | |
| 2009/0054123 A1 | 2/2009 | Mityagin et al. | |
| 2009/0063991 A1* | 3/2009 | Baron | G06Q 10/10 |
| | | | 715/751 |
| 2009/0092374 A1 | 4/2009 | Kulas | |
| 2009/0132918 A1 | 5/2009 | Deyo | |
| 2009/0293079 A1 | 11/2009 | McKee et al. | |
| 2009/0318209 A1* | 12/2009 | Gwaltney | A63F 13/12 |
| | | | 463/9 |
| 2010/0017474 A1 | 1/2010 | Kandekar | |
| 2010/0071013 A1 | 3/2010 | Vandermolen et al. | |
| 2010/0246965 A1 | 9/2010 | Epshtein | |
| 2011/0320455 A1 | 12/2011 | Jonas | |
| 2012/0077175 A1* | 3/2012 | Levisay | G09B 5/06 |
| | | | 434/322 |

OTHER PUBLICATIONS

Notice of Allowance and Fees Due dated Sep. 16, 2015 in U.S. Appl. No. 13/074,832.
Non-Final Rejection dated Jan. 28, 2015 in U.S. Appl. No. 13/074,832.
Non-Final Rejection dated Jun. 9, 2014 in U.S. Appl. No. 13/074,832.
Non-Final Rejection dated Sep. 26, 2013 in U.S. Appl. No. 13/074,832.
Final Rejection dated May 6, 2015 in U.S. Appl. No. 13/074,832.
Final Rejection dated Aug. 25, 2014 in U.S. Appl. No. 13/074,832.
Final Rejection dated Apr. 24, 2014 in U.S. Appl. No. 13/074,832.
Amendment dated Aug. 5, 2015 in U.S. Appl. No. 13/074,832.
Amendment dated Apr. 28, 2015 in U.S. Appl. No. 13/074,832.
Amendment dated Nov. 25, 2014 in U.S. Appl. No. 13/074,832.
Amendment dated Jul. 25, 2014 in U.S. Appl. No. 13/074,832.
Amendment dated May 13, 2014 in U.S. Appl. No. 13/074,832.
Amendment dated Dec. 26, 2013 in U.S. Appl. No. 13/074,832.

* cited by examiner

FIG. 6

Advisory Services Network — 600

Time Left in Game: — 602
03:20:34:12

Welcome, Username! — 604
Your Rank:
Junior Investigator

— 606
Your Score: 3,333

Leaderboard   Feedback   Help — 608

Your Decision History:
Introduction ▶ The General Public ▶ The Incident Commander ▶ The Situation Unit Leader — 610

— 612

The Story — 616
The Situation Unit Leader

— 618

— 622
Lorem ipsum dolor sit amet, consectetur adipiscing elit. Vivamus neque urna, facilisis adipiscing vulputate sed, semper sed eros. Aenean condimentum volutpat risus et tempor. Cras sed facilisis metus.

Cras blandit, augue quis sollicitudin feugiat, leo lorem egestas diam, ut dignissim mauris nibh non lorem. Donec consectetur nunc non nunc posuere eu volutpat lectus aliquet. Donec at eros orci.

Phasellus nec urna mi. Sed elementum sagittis nisi id mollis. Maecenas eu lacus vel lacus rutrum convallis et eget lectus.

— 614

620 —

624 —
Related Evidence (X)
(x discussions)

— 626
Dossier (X)
(x discussions)

Next, You
Decide To...

Donec sit amet ornare turpis

Aenean vel nulla sit amet

Sed arcu erat, ultrices vel — 628

VIDEO VIEWING AND TAGGING SYSTEM

CLAIM OF PRIORITY

This application is a continuation of and claims priority to U.S. application Ser. No. 13/074,832 filed Mar. 29, 2011, which claims priority to U.S. Provisional Application Ser. No. 61/409,017, filed on Nov. 1, 2010, entitled "VIDEO VIEWING AND TAGGING SYSTEM", the entirety of which is incorporated herein by reference.

TECHNICAL FIELD

The subject disclosure relates to a video viewing and tagging system for a game, within an advisory services network, that enables a variety of players to extract specific segments of videos and share the specific segments for discussion among the variety of players to achieve overall goals (e.g., solutions to complex problems) of the advisory services network.

BACKGROUND

In enterprise business, the importance of information technology (IT) is ever increasing. Large enterprise organizations rely more and more on robust technology products and related services to support their businesses. Over the past several decades, a large consulting services industry has developed to support and service these large enterprise organizations. Typically, consulting organizations apply one model in executing consulting services. This model involves top-performing, senior level consultants developing customer service partnerships with large enterprise organizations. The senior level consultants leverage a large number of junior consultants to design IT solutions. This model, however, is not easily scalable, it is labor intensive and thus expensive, and does not guarantee quality results. In addition, consulting organizations attempt to leverage previous solutions, developed for other customers, as a means for raising profit margins. This approach leads to non-differentiated solutions which partially address core problems of the enterprises.

Enterprise organizations seek the assistance of consultants to identify, analyze, and solve complex business problems. Complex business problems, as the name suggests, can be extremely complex, and result from various factors. For instance, complex business problems can arise from a series of business changes, rapid growth of businesses, technology changes, and/or technological limitations.

Enterprise organizations, who understand their businesses to a greater extent than consulting firms, desire a collaborative approach in which the enterprise organizations and consulting firms work closely to develop creative business solutions for complex problems. Accordingly, it can be beneficial to leverage business knowledge, held by the enterprise organizations, to immerse a team of consultants into the problems faced by the enterprise organizations in order to develop effective solutions.

One possible immersion mechanism is "serious" games. Serious games can encompass many forms and subject matters and teach players information relating to education, health, science, law and government, computers, and/or a multitude of other subjects. Typically, computer games are designed for entertainment purposes. However, with serious games, the goal is to train and educate players through a planned curriculum and set of objectives. Players can learn new material in a fun, educational environment. Conventional serious games, while challenging, are not aimed at real-life business problems nor provide clear problem statements and solutions which can be implemented by enterprise organizations. Rather, conventional serious games are designed to look at societal weaknesses and/or extreme world disaster scenarios in the world and in the future without regard to the existence of workable solutions.

Another challenge with consulting services and immersion mechanisms arises due to the sheer complexity of problems faced by enterprise organizations. For example, complex problems can involve vast amounts of data which can require research and analysis by a wide array of experts to comprehend the complex situations presented by the complex problems and any possible implications. Enterprise organizations can spend countless hours building data portfolios containing details which summarize the what, why, when, where, who, and how of a complex business problem. After data compilation, experts read, parse, review, and absorb all the information in order to develop a reasonable problem statement.

Reviewing volumes of data takes time and money due to people researching and creating systematic approaches to reduce the volumes of data into a reasonable problem concept. In a specific example, enterprise organizations, experiencing complex problems, assemble information around the problem areas in order to understand the complexities of the issues. To facilitate dissemination and comprehension of the information, the enterprise organizations can contextualize, clarify, simplify, and synthesize the information around the problem. One way to facilitate understanding of a problem is to provide contextual data. While contextual data is difficult to explain, ethnographic portrayals and interviews through video footage simulate contextual data such as culture, customs, language, terminology, and specific environments utilized in settings of enterprise organizations.

After recording video interviews, numerous hours can be spent by researchers to review the video. However, a portion of the information captured within a video clip can be insignificant. For instance, portions of the video footage can include dead spaces or transitions during which a video recorder continues to run. While such portions can be edited, e.g., removed, a lot of the remaining information in the video footage can bear little relevance to the complex problems of enterprise organizations. Accordingly, even when edited, large amounts of video footage can be unruly to review, parse, and analyze.

The above-described deficiencies of conventional consulting solutions and video viewing systems are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In various, non-limiting embodiments, an advisory services network is provided that enables enterprise organizations to identify complex business problems from apparent business problems, immerse a diverse group of people in the businesses of the enterprise organizations, and promote collaboration to develop viable solutions to the complex business problems. An enterprise organization can supply a collection of data to enable members of the diverse group of people to immerse themselves into the problem space, participate in creative discussions, and brainstorm potential solutions. The advisory services network can include a gaming platform on which instances of serious games can be developed and deployed. Serious games deployed on the gaming platform guide players (e.g., members of the diverse group of people sourced by the advisory services network) through a thought-provoking environment in which the players uncover idiosyncrasies and complexities of the business of an enterprise organization. Through the serious games on the gaming platform, players are immersed in the problem space of the enterprise organization. The players are encouraged to identify real problems of the enterprise organization, for which solutions are currently unknown, and develop potential solutions to those real problems. The gaming platform further enables sharing of ideas among players, discussions among players, and other player interactions to facilitate compounding of perspectives and solutions among a diverse group.

In yet another embodiment, the advisory services network and/or gaming platform can include a video tagging and viewing system configured to enable players, while engaging in a game on the gaming platform, to review video footage, highlight relevant portions, and initiate communications regarding the relevant portions. Particularly, the video tagging and viewing subsystem powers the review of videos, the marking of segments of the videos, tagging of videos or segments for categorization, creation of discussions around the videos or segments, the addition of videos or segments as evidence to a dossier, the embedding of videos or segments into existing discussions, etc.

These and other embodiments are described in more detail below.

BRIEF DESCRIPTION OF THE DRAWINGS

Various non-limiting embodiments are further described with reference to the accompanying drawings in which:

FIG. 6 is an exemplary, non-limiting illustration of a user interface of a gaming environment of an advisory services network;

DETAILED DESCRIPTION

Overview

Figure 1:
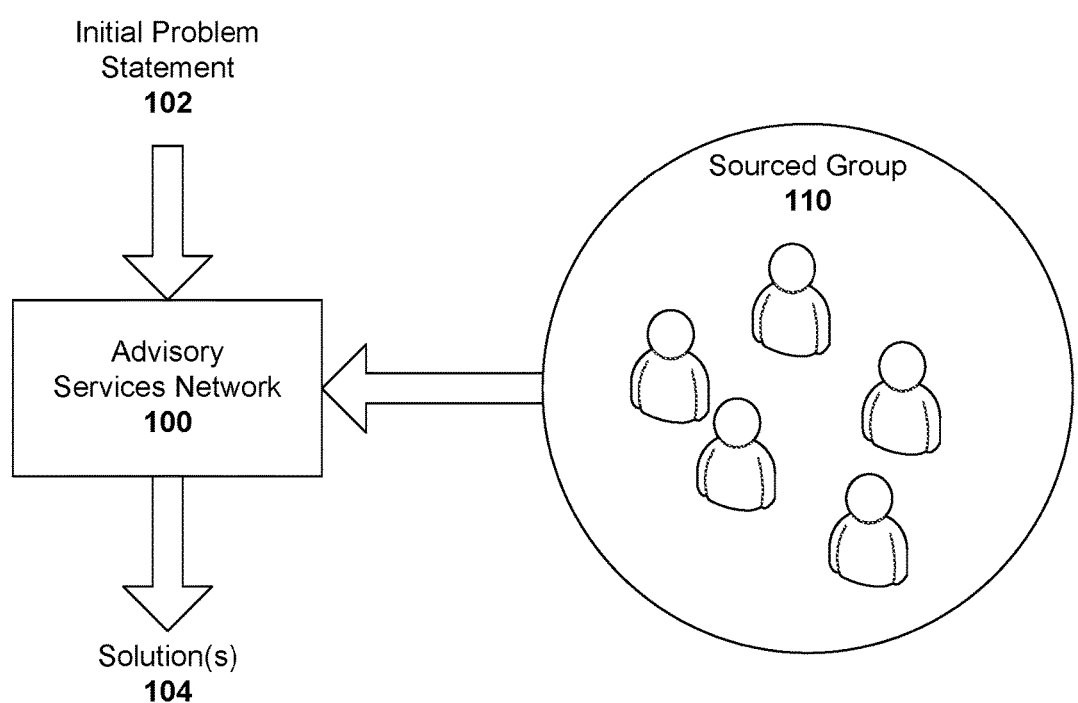
FIG. 1 is a block diagram illustrating an exemplary, non-limiting advisory services network for sourcing a group to develop solutions to complex problems.

As discussed in the background, conventional consulting services employ a non-scalable and expensive business model that often produces non-differentiated solutions to enterprise organizations facing complex problems. In addition, a large volume of information is typically associated with the complex problems, which requires a significant effort to absorb and understand. Accordingly, conventional consulting services cannot cost effectively immerse themselves in the business of enterprise organizations in order to provide high quality, viable solutions to complex problems.

In various, non-limiting embodiments, an advisory services network is provided that enables enterprise organizations to identify complex business problems from apparent business problems, immerse a diverse group of people in the businesses of the enterprise organizations, and promote collaboration to develop viable solutions to the complex business problems. An enterprise organization can supply case studies of real-life scenarios, data, ethnographic interviews to convey multiple views of problematic areas, etc., to enable members of the diverse group of people to immerse themselves into the problem space, participate in creative discussions, and brainstorm potential solutions. In addition to immersion, the advisory services network can improve solution building processes through identification of subject matter experts. The subject matter experts, drawn from the diverse group of players interacting in the advisory services network, can collaborate, co-innovate, and problem solve in a virtual team environment fostered by the advisory services network.

According to a further embodiment, the advisory services network can include a gaming platform on which instances of serious games can be developed and deployed. Serious games deployed on the gaming platform guide players (e.g., members of the diverse group of people sourced by the advisory services network) through a thought-provoking environment in which the players uncover idiosyncrasies and complexities of the business of an enterprise organization. Through the serious games on the gaming platform, players are immersed in the problem space of the enterprise organization. The players are encouraged to identify real problems of the enterprise organization and develop potential solutions to those real problems. The gaming platform further enables sharing of ideas among players, discussions among players, and other player interactions to facilitate compounding of perspectives and solutions among a diverse group.

In yet another embodiment, the advisory services network and/or gaming platform can include a video tagging and viewing subsystem configured to enable players, while engaging in a game on the gaming platform, to review video footage, e.g., evidence, conveying ethnographic information and highlight relevant portions while filtering extra or irrelevant footage. For instance, the video tagging and viewing subsystem enables a game player to select specific segments of a video to extract information that is particularly germane to the real problems of the enterprise organization, mark the extracted information, discuss the extracted information, and/or otherwise share the information with other players.

In a specific, non-limiting example, the video tagging and viewing subsystem enables review of videos, highlight and marking of segments of the videos, tagging of videos for categorization, start discussions around the videos, rate videos, add videos as evidence to a dossier, embed videos into existing discussion, etc. Thus, the video tagging and viewing subsystems of the advisory services network gaming platform facilitates reviewing and sharing of a large number of video files by a diverse group of game players. The videos can be viewed and tagged at specific moments, segments of the videos can be saved, and selected segments can be shared with players to obtain feedback, exchange perspectives, etc. Video reviewing and tagging allows players to start discussions around videos and/or segments of videos. Further, video reviewing and tagging enables players to add additional information, e.g., tags or labels, to videos. The tags can be employed to convey additional information to other reviewers, e.g., players, and as a notation mechanism to enable recollection of a significance of a particular video or portion thereof. Moreover, tags can be employed as search criteria to enable players to search for videos based upon classifications implemented via the tags. Tags, in an embodiment, can be default tags or player-created.

In one embodiment, a method is described herein that includes receiving time field selection parameters from a user interface, wherein the time field selection parameters specify a segment of a video visually presented on the user interface, creating a new discussion thread on a discussion platform, such as a discussion board, wherein a topic of the new discussion thread centers around the segment of the video, and updating the user interface to indicate the creating of the new discussion thread and association of the discussion thread with the segment of the video. In an example, the creating of the new discussion can include generating a data structure that represents the new discussion thread and populating the data structure with information. The information, in a further example, includes at least one of a username of an initiator of the new discussion thread, a time and date of creation, an initial comment text obtained from the user interface, a file attachment, or a hyperlink attachment.

According to further examples, the method can include receiving a command from the user interface, wherein the command triggers the creation of the new discussion thread and identifying a start time and an end time of the segment of the video based on the time field selection parameters. In addition, the method can include extracting the segment of the video from an entirety of the video and associating the segment of the video extracted to the new discussion thread.

In yet another example, the method includes linking the new discussion thread and the segment of the video to indicate that the topic of the new discussion thread relates to the segment of the video. Further to this example, the link of the new discussion can include generating metadata that associates a first identifier, associated with the new discussion thread, and a second identifier corresponding to the video, appending time field information to the metadata, wherein the time field information delineates the segment of the video relative to a time line of the video, and storing the metadata generated in a data store. According to further examples, the updating of the user interface can include displaying a tag, that links to the new discussion thread, on a playback timeline of the user interface, wherein the tag includes a visual indication, of the segment of the video specified by the time field selection parameters, along the playback timeline and a visual representation of an initiator of the new discussion thread. In addition or as alternative, the update of the user interface can include receiving an identifier of content for display on the user interface, querying a metadata store with the identifier to acquire a set of related content identifiers; acquiring related content from a plurality of data stores based on the set of related content identifiers, and generating user interface content based on a composite of the related content and the content for display.

According to further embodiments, a method is described herein that includes receiving a command relating to a pre-existing discussion thread presented on a user interface and time field parameters relating to a disparate media item, updating a content of the pre-existing discussion thread based on the command and the disparate media item, associating the pre-existing discussion thread with a segment of the disparate media item extracted according to the time field parameters, and updating the user interface to reflect the content updated and the associating of the pre-existing discussion thread and the segment of the disparate media item. In an example, the method can also include generating metadata that associates a first identifier, corresponding to the discussion thread, and a second identifier corresponding to the media item, and storing the metadata generated in a data store.

In an additional embodiment, a gaming platform of an advisory services network is described herein that includes a game engine associated with an instance of a game and configured to manage execution of the game, wherein a variety of players participate to solve a real-world problem for which a solution is yet to be found based on evidence input to the game. The gaming platform further includes an interface module configured to maintain display content a user interface and to receive player input from the user interface and a plurality of data storage locations such as an evidence store configured to retain a collection of data related to a complex problem of a sponsor of the game, wherein the collection of data includes media files conveying ethnographic information received from the sponsor and a discussion store configured to store discussion threads. In addition, the game engine can include a video viewing and tagging subsystem configured to retrieve a first media file from the evidence store, tag a portion of the first media file, and create a new discussion thread that pertains to the portion of the first media file tagged.

In an example, the view viewing and tagging subsystem is further configured to retrieve a second media file from the evidence store, to identify a pre-existing discussion thread stored in the discussion store and presented on the user interface, and to associate the second media file with the pre-existing discussion thread. For instance, the video viewing and tagging subsystem can include a linking module configured to associate the new discussion thread with the portion of the first media file. The linking module is further configured to generate a metadata entry based on a first identifier corresponding to the new discussion thread and a second identifier corresponding to the first media file, wherein the metadata correlates the first identifier and the second identifier. According to an example, the metadata entry includes information that specifies the portion of the first media file as a function of an entirety of the first media file.

In another example, the plurality of data stores further includes a metadata store configured to store metadata that associates discussion threads stored in the discussion store to media files stored in the evidence store. In yet another example, the game engine can include a tagging module configured to associate a label with the portion of the first media file and a user interface content module configured to generate user interface content, maintained by the interface module, based on media files stored in the evidence store and respective discussion threads respectively associated with the media files.

Herein, an overview of some of the embodiments for a video tagging and viewing system in an advisory services network gaming platform has been presented above. As a roadmap for what follows next, an overview of exemplary, non-limiting embodiments and features of an advisory services network and/or an advisory services network gaming platform are described in more detail. Then, various exemplary, non-limiting embodiments and features for viewing and manipulating video in the gaming platform are described. Finally, some non-limiting implementations and examples are given for additional illustration, followed by representative network and computing environments in which such embodiments and/or features can be implemented.

Overview of an Advisory Services Network and Gaming Platform

As mentioned above, in various embodiments, an advisory services network enables consulting services to be rendered to enterprise organizations facing complex problems. The advisory service network, unlike conventional consulting business models, does not rely on a handful of senior consultants maintaining customer relationships while junior consultants handle problem solving. The advisory services network provides immersion mechanisms through utilization of ethnography, capitalizes on a crowd sourcing to a diverse group and engages identified experts in a talent marketplace to develop quality solutions to enterprise organizations.

The advisory services network implements several primary aspects. First, the advisory services network facilitates transforming the problem. Transforming the problem includes methodology to immerse experts in real-life case studies to identify with complex problems faced by enterprise organizations. For instance, transforming the problem can involve the use of ethnography (e.g., real-life interviews and observations) to obtain perspective on a culture, problems, and experiences of an enterprise organization. In addition, transforming the problem can involve various immersion tactics to place the consultants within the advisory services network in the place of the enterprise organization, e.g., walk in their shoes. Further, transforming the problem can include querying a crowd to expose or uncover a core problem or identify other problems. The advisory services network can also facilitate crowd sourcing a solution, including methodology to utilize a large diverse group of individuals to solve complex problems. Finally, the advisory services network can implement a talent marketplace with methodology to leverage solution concepts and transform solution concepts into collaborative solutions.

In a specific, non-limiting embodiment, the advisory services network can be implemented as a gaming platform to coordinate transforming the problem, crowd sourcing problem solving, and engaging experienced talent to develop real world solutions. A serious game, e.g., a game with a primary objective to be fun and educational, can be developed on the gaming platform. The game can be based around one or more complex problems plaguing an enterprise organization. In particular, the developed game can include a back story, a plurality of narratives, and evidence (e.g., videos, graphics, documents, data, etc.).

The game immerses players (e.g., members of a diverse source group of the advisory services network) into the problem space of the enterprise organization. The game challenges players to identify real problems from apparent problems and develop possible solution to the real problems. The game encourages players to share ideas with other players who can provide fresh perspectives and additional input based upon their own, individual findings. As the game pushes more and more players to offer viewpoints and solutions concepts, the game provides mechanisms to enable players to interact, exchange ideas, and discuss ideas. In this manner, the players can modify their own ideas based upon the viewpoints of other players, collaborate together on solutions, and otherwise uncover high quality and robust solutions via perspective compounding.

With respect to one or more non-limiting aspects of the advisory services network as described above, FIG. 1 shows a block diagram illustrating an exemplary, non-limiting embodiment for sourcing a group to develop solutions to complex problems. As shown in FIG. 1, an advisory services network 100 can receive an initial problem statement 102, which can establish a goal to achieve or a purpose of the advisory services network 100. In an example, an enterprise organization, a business, a governmental organization, or other similar entity experiencing a complex problem can supply initial problem statement 102, which attempts to portray the complex problem. In another example, the initial problem statement 102 can indicate a request to identify a problem of the enterprise organization, business, governmental organization, etc., based upon observed, undesired effects.

Advisory services network 100 draws upon sourced group 110 to generate and develop one or more solutions 104, which potentially solve the complex problem of the sponsor, e.g., the organization supplying initial problem statement 102. Sourced group 110 can include diverse group of experts, consultants, and other people. Diversity with sourced group 110 can exist in a variety of ways. For instance, members of sourced group 110 can exhibit diversity in terms of geography, culture, ethnicity, age, education, career, skills, background, experience, etc. Source group 110 can be built to achieve, intentionally, diversity in one or more characteristics. It is also to be appreciated that, as source group 110 grows in size, diversity in a variety of aspects inevitably occurs.

The advisory services network 100, in an aspect, increases exposure of a complex problem or goal embodied in the initial problem statement 102 to sourced group 110, which can be very large relative to a size of the sponsor supplying the initial problem statement 102. The sponsor can supply case studies depicting real-life scenarios, data, multiple views of problematic areas through ethnographic interviews, etc. to enables members of sourced group 110 to immerse themselves into the problem space. Advisory services network 100 facilitates, encourages, and manages creative discussions, among members of sourced group 100, regarding potential solutions. Advisory services network 100 challenges the conventional consulting services model which relies on knowledge of a handful of top consultants in a large consulting organization. Advisory services network 100 employs immersion techniques, crowd sourcing, and a talent marketplace to, respectively, convey extensive knowledge held by the sponsor regarding the problem space, leverage strengths and wisdom of a large diversified group, and surface great solutions and discuss the solutions with experts.

For instance, advisory services network 100 enhances solution building by identifying subject matter experts and enabling the subject matter experts to collaborate, co-innovate, and problem solve, in a virtual team environment. Subject matter experts, through advisory services network 100, can communication with one another, without being collocated, and leverage knowledge, skills, and experiences of the subject matter experts to solve complex problems and innovate further ideas. Accordingly, advisory services network 100 bridges geographical and cultural divides among experts and other members of sourced group 110 and brings them together in a virtual environment where sourced group 110 engage in discussions around complex problems and formulate solutions.

Figure 2:
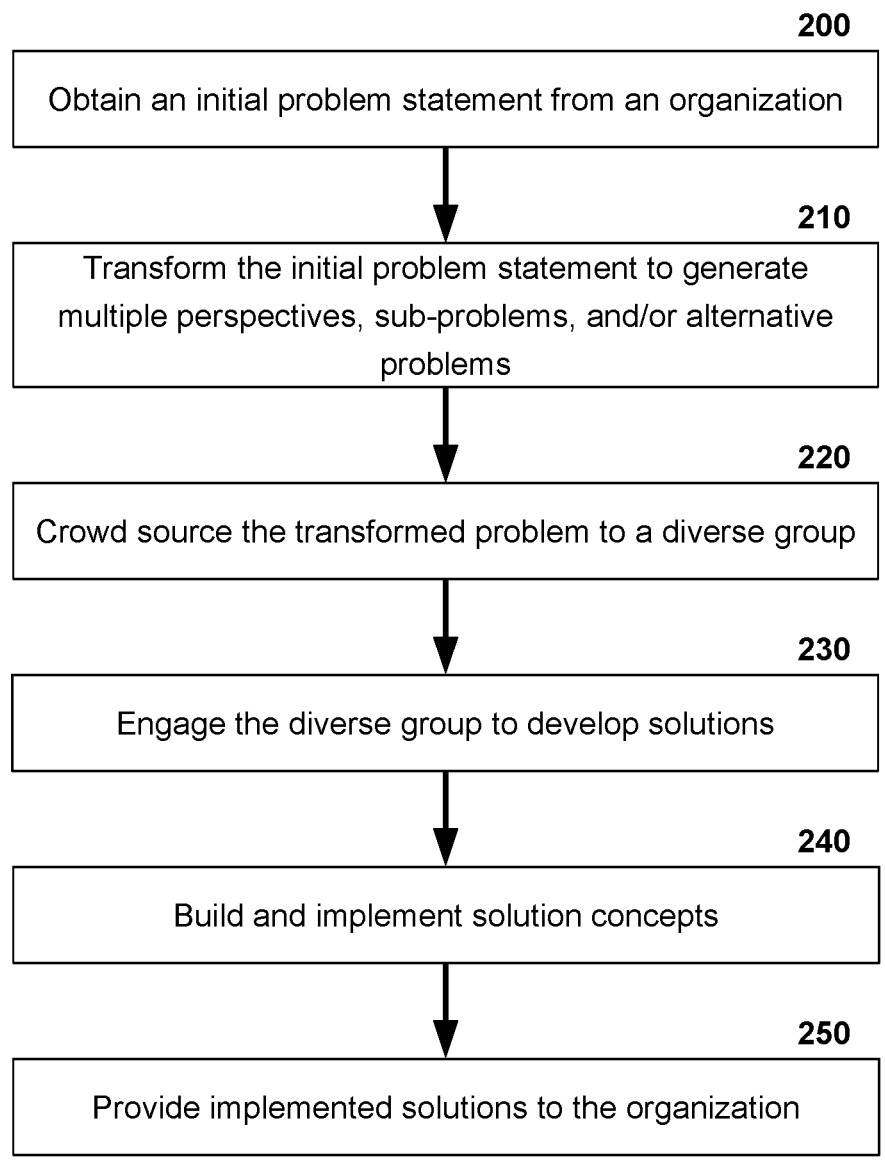
FIG. 2 is a flow diagram illustrating exemplary, non-limiting embodiment for developing solutions to complex business problems via crowd sourcing.

FIG. 2 depicts a flow diagram illustrating an exemplary, non-limiting embodiment for developing solutions to complex business problems via crowd sourcing. The embodiment shown in FIG. 2 can be utilized by advisory service network 100 of FIG. 1 to leverage sourced group 110 to develop solutions 104 based upon initial problem statement 102. At 200, an initial problem statement is obtained from an organization. The initial problem statement can convey an apparent problem faced by the organization. According to a non-limiting example, the apparent problem can be related to dataflow and information sharing limitations, capturing and transmitting real-time data, securing the right resources and equipment, brainstorming future innovations, etc.

At 210, the initial problem statement is transformed to generate multiple perspectives, sub-problems, and/or alternative problems. The problem can be transformed by a diverse group of participants in the advisory services network through direct observations, ethnographic interviews, support documents, etc., which capture various viewpoints of the initial problem statement from employees and associates of the organization. In addition, participants in the advisory services network can build dossiers to provide multiple perspectives or views of the problems faced by the organization, to articulate root problems of the organization, and/or to present focused opportunities for the organization in the future. During this phase, the participants immerse themselves in the problem space, review qualitative and quantitative data, and provide a wide variety of insights and perspectives as a result.

At 220, the transformed problem is crowd sourced to a diverse group. Crowd sourcing is a model that leverages collective insights and experience of the diverse group to produce quality results. Through crowd sourcing, the diverse group can work together to capitalize on strengths of the varied background, experiences, and individuality that each member of the diverse group. For instance, each member of the diverse group can offer a varied perspective on the transformed problem, and the diverse group, collectively or individually, can build upon the perspectives of others. The diverse group, harnessing multiple perspectives, can produce greater results than a homogenous group. During the crowd sourcing phase, members of the diverse group can, through advisory services network 100, offer solution, ideas, perspectives, build upon solutions, ideas, perspectives of others, and/or provide feedback on solutions, ideas, or perspectives.

At 230, the diverse group is engaged to develop solutions. In an aspect, engaging the diverse group occurs during crowd sourcing to encourage members of the diverse group to participate in crowd sourcing. In a specific, non-limiting example, a rewards-based model can be employed to entice members of the diverse group to participate and develop solution concepts.

At 240, solution concepts are built and implemented. For example, in the previous phases, subject matter experts can be identified in the diverse group. Virtual teams can be constructed around these subject matter experts. The virtual teams can collaborate to translate solution concepts, submitted by the diverse group sourced by the advisory service network, into solution designs and architectures. The organization can select one or more solution designs and architectures for implementation and deployment. At 250, implemented solutions are provided to the organization for deployment.

Figure 3:
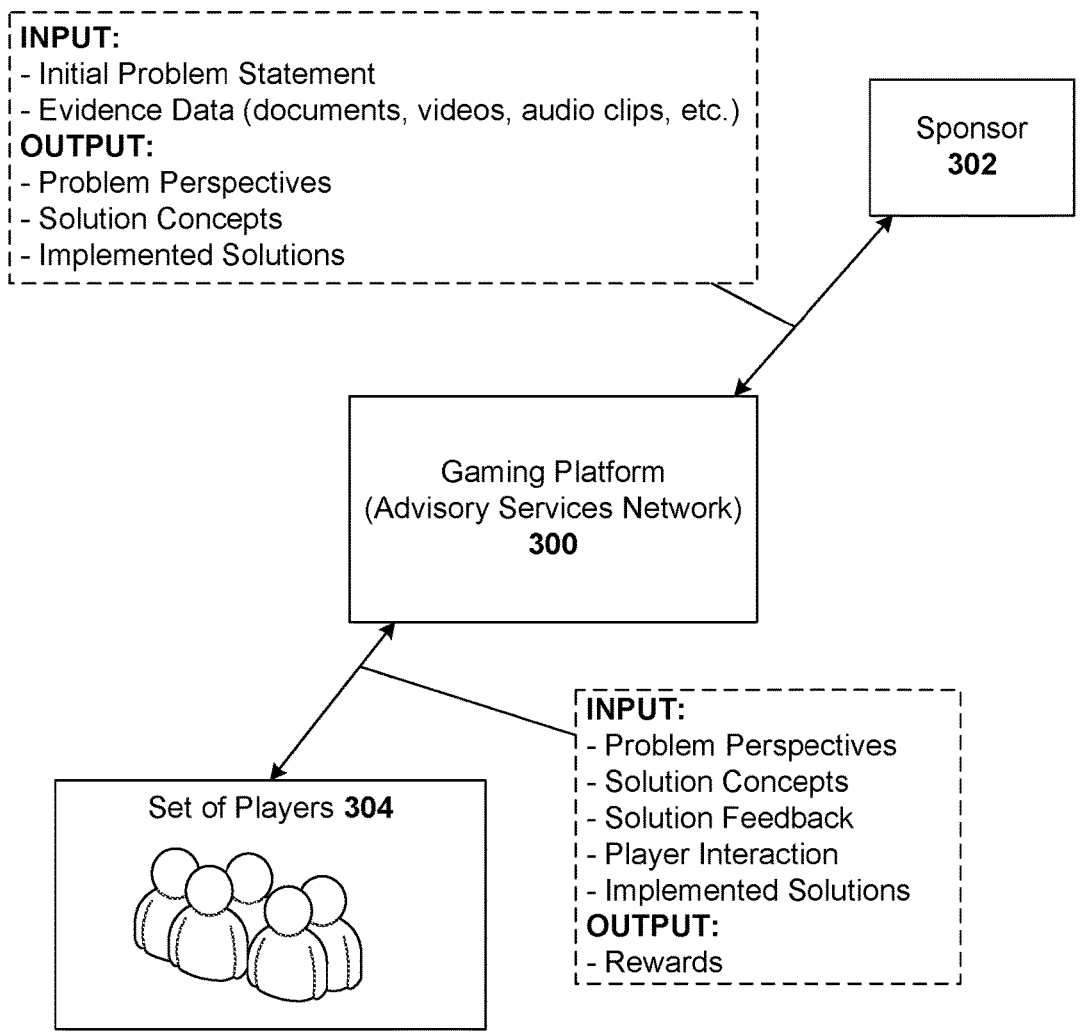
FIG. 3 is a block diagram illustrating an exemplary, non-limiting embodiment of an advisory services network implemented as a gaming platform.

Turning to FIG. 3, a block diagram is shown illustrating an exemplary, non-limiting embodiment for a gaming environment which immerses players in problems faced by an organization. As shown in FIG. 3, a gaming platform 300, implementing the advisory services network, on which a serious game can be designed, implemented, and deployed. The serious game, as mentioned above in the Overview, can provide an entertaining and thought provoking environment in which at least a portion of the process described with respect to FIG. 2 can occur. For instance, the serious game can be designed to facilitate solving real-world complex business problems and challenges faced by an organization, such as sponsor 302. The serious game of gaming platform 300 is configured to immerse a set of players 304 into the business of sponsor 302, to engage and reward the set of players 304 for solution building, and to promote interaction, collaboration, and discussion among the set of players 304.

As illustrated in FIG. 3, gaming platform 300 obtains various inputs from sponsor 302 and/or the set of players 304. In addition, gaming platform 300 provides various outputs to sponsor 302 and the set of players 304. For instance, sponsor 302 can supply gaming platform 300 with an initial problem statement specifying an apparent problem and evidence such as videos, audio clips, documents, etc., which further detail the apparent problem. The gaming platform 300 employs the initial problem statement and evidence to establish a setting (e.g., introduction and narrative game content) of the serious game corresponding to the complex problems suffered by sponsor 302. The setting provides a story in which the evidence fits while also supporting the evidence.

The set of players 304, via the established setting, carry out the steps of the advisory services network process described in FIG. 2. For instance, the set of players 304 can provide input to the game in the form of problem perspectives (e.g., description of each player's view of the problems of sponsor 302), solution concepts, feedback on solution concepts of other players, interactions and discussions among players, implemented solutions, and the like. Through gaming platform 300, sponsor 302 is presented with the problem perspectives, solution concepts, and implemented solutions developed by the set of players 304. In return, the set of players 304 achieve rewards (e.g., points). It is to be appreciated that the inputs and outputs illustrated in FIG. 3 are several examples to facilitate understanding of the gaming platform 300 and are a non-exhaustive listing of the inputs and outputs which can expressed in the gaming platform 300.

Figure 4:
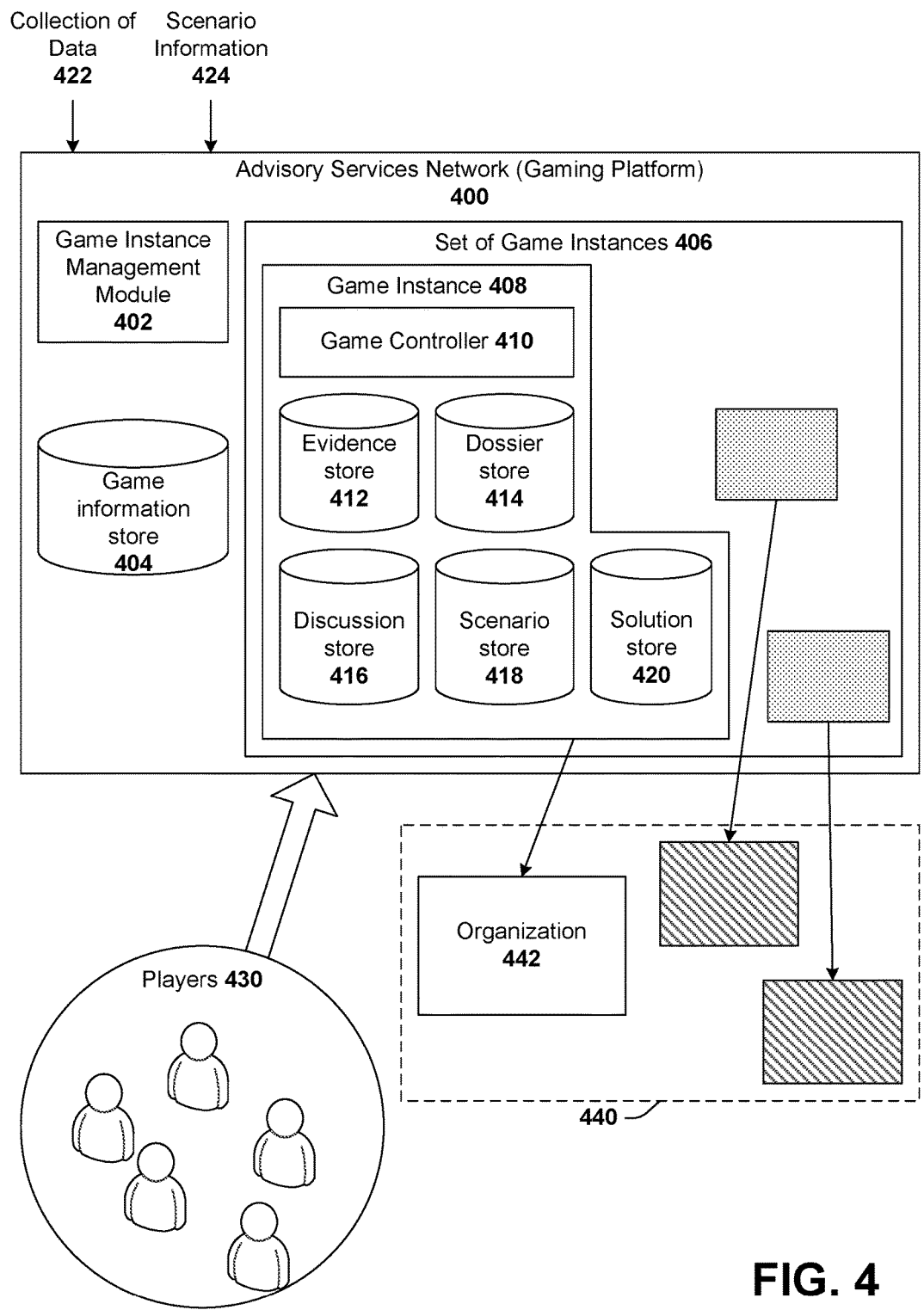
FIG. 4 is a block diagram of an exemplary, non-limiting embodiment of a advisory services network hosting a game instance.

Turning to FIG. 4, illustrated is a block diagram of an exemplary, non-limiting embodiment of advisory services network 400 or gaming platform configured to host a plurality of serious game instances. As shown in FIG. 4, the advisory services network 400 hosts a set of game instances 406, where each game instance is a playable serious game. While FIG. 4 depicts the set of game instances 406 having three game instances, it is to be appreciated that FIG. 4 is an exemplary embodiment to illustrate one or more aspects of the advisory services network 400 and that the set of game instances 406 hosted by the advisory services network 400 can include up to N game instances, where N is an integer greater than or equal to one.

Advisory services network 400 can include a game instance management module 402 configured to administer the set of game instances 406. According to a specific, non-limiting example, the game instance management module 402 can instantiate new game instances. The game instance management module 402 can generate a new game instance from received information provided by a sponsor of the new game instance (e.g., an organization with a complex problem) or developed, by a provider of the advisory services network, based upon information obtained from the sponsor. Specifically, game instance management module 402 creates game instance 408 based upon a collection of data 422 and scenario information 424 provided to the advisory services network 400. The collection of data 422 can include various items of evidence, e.g., photos, videos, audio clips, documents, etc., which support or explain aspects of a complex problem providing the setting of game instance 408. Scenario information 424 can include a series of narratives divided into scenes which organize the collection of data 422 in a meaningful manner to provide a player with a fun and thought-provoking journey through the complex problem of game instance 408. Scenario information 424 can be created so as to immerse players 430 in the world of the sponsor of game instance 408 while playing the game.

Game instance management module 402 instantiates game instance 408 and populates various data stores therein with data based upon the collection of data 422 and the scenario information 424. The instantiated game instance 408 can be a data structure which is populated by the collection of data 422 and scenario information 424 and stored in game information store 404 along with other game instances of the set of game instances 406 which have been created. In a specific example, when creating game instance 408, game instance management module 402 can store the collection of data 422 into an evidence store 412. In addition, game instance management module 402 can save scenario information 424 into a scenario store 418. Further, game instance management module 402 configures a game controller 410, which maintains a user interface for players 430, handles input from players 430, progresses game play in accordance with scenario information stored in the scenario store 418, manages access and storage of data to the various data stores of game instance 408, and performs a variety of other functions. As players 430 engage the serious game provided by game instance 408, game controller 410 appropriately responds. As described above, players 430 can navigate through scenes and narratives, view supporting evidence, manipulate evidence, and select items of evidence to be added to dossiers respectively associated with the players 430. Game controller 410 receives navigation input from players 430, retrieves requested scene information from scenario store 418, and generates a corresponding user interface presented to players 430. Moreover, game controller 410 can receive the evidence selection and update dossier information in a dossier store 414 appropriately.

As described above, an aspect of serious games provided by advisory services network 400 is the ability of players 430 to suggest, develop, collaborate, etc. on solutions to the complex problem of the sponsor via communications, such as discussions. As players 430 collaborate to generate solutions and/or solution concepts, game controller 410 retains communications (e.g., discussions, evidence linkings, messages, etc.) in a discussion store 416 and the solutions and solutions concepts in a solution store 420. While FIG. 4 depicts the various data stores as distinct elements, it is appreciated that such separation is a functional separation intended to facilitate comprehension of one or more features of serious games hosted by the advisory services network

400. It is to be appreciated that single data store, with or without partitions, can be employed to store various game, evidentiary, and player-generated information.

As shown in FIG. 4, each game instance in the set of game instances 406 can be associated with a sponsor, such as an organization with a complex problem, from a set of organizations 440. In a specific, non-limiting example, game instance 408 corresponds to organization 442. Accordingly, the collection of data 422 and scenario information 424 employed to generate game instance 408 can originate from organization 442 and can relate to a complex business problem of organization 442. While FIG. 4 shows game instances in the set of game instances 406 individually and respectively associated with distinct organizations in the set of organizations 440, it is to be appreciated that a single organization can sponsor multiple game instances corresponding to multiple complex business problems, or multiple organizations can sponsor a single game instance related to a shared complex problem.

Figure 5:
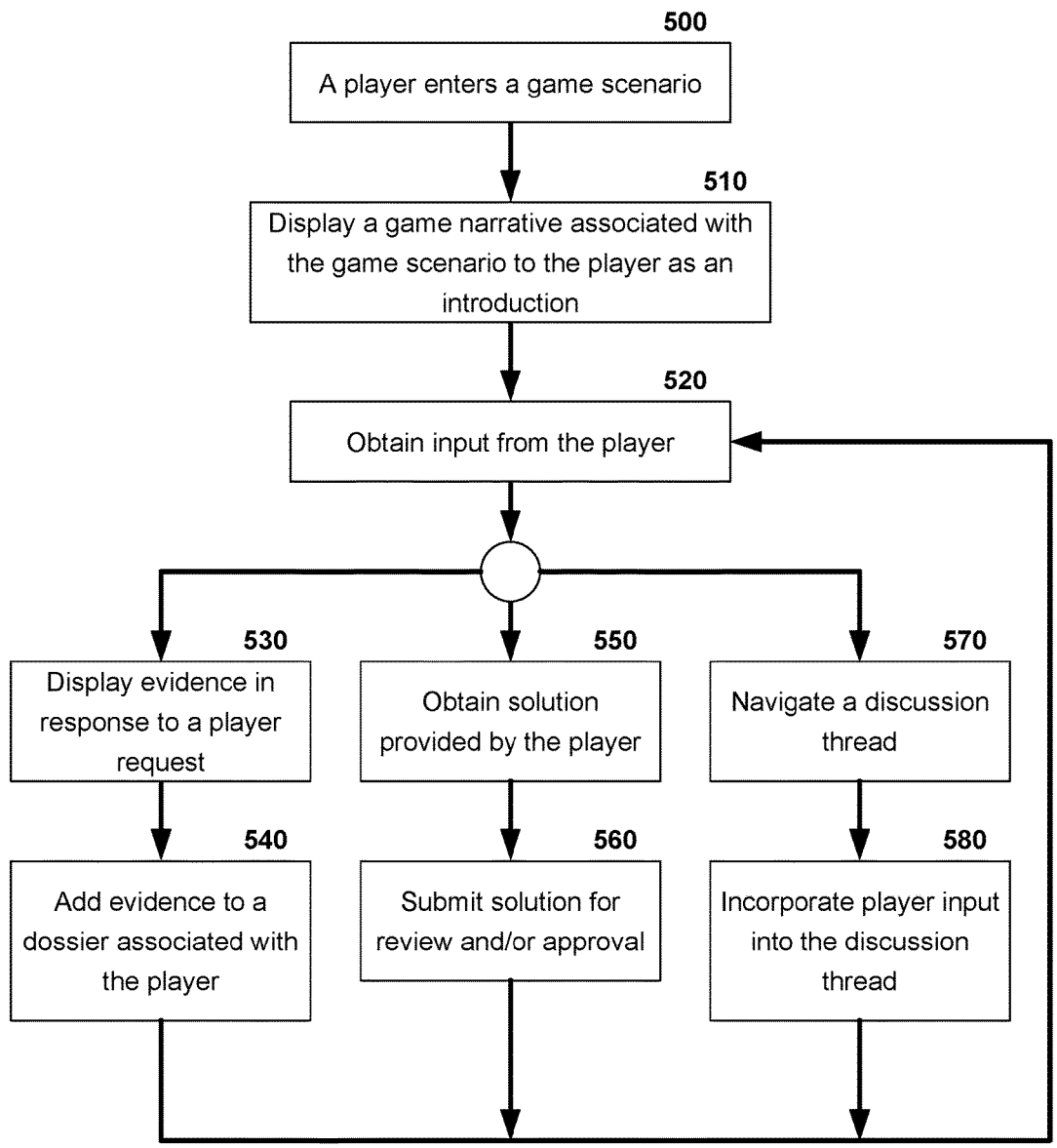
FIG. 5 is a flow diagram illustrating an exemplary, non-limiting embodiment for a gaming environment which immerses players in a business of an enterprise organization facing a complex business problem.

FIG. 5 shows a flow diagram illustrating an exemplary, non-limiting embodiment for a gaming environment which immerses players in a business of an enterprise organization facing a complex business problem. The embodiment depicted in FIG. 5 is one example of a workflow followed by the set of players 304 of a serious game of gaming platform 300 from FIG. 3 or players 430 interacting with game instance 408 from FIG. 4. At 500, a player enters a game scenario. At 510, a game narrative association with the game scenario is displayed to the player as an introduction. The narrative, according to an exemplary embodiment, can include a plurality of scenes each portraying a portion of a larger story specifying a complex problem. After reading through the game narrative, the player can begin interacting with the game. Accordingly, at 520, input is obtained from the player. The input provided by the player can take several forms or indicate one of several actions desired by the player. In one example, the input can be a selection of an item of evidence associated with a particular scene of the narrative. In response to this input, at 530, the selected item of evidence is displayed to the player. At 540, the selected item of evidence is added to a dossier associated with the player.

In another example, the input can be a solution or a solution concept developed by the player. At 550, the solution or solution concept, provided by the player, is obtained. At 560, the solution or solution concept is submitted for review and/or approval by, for example, an organization whose complex problem is modeled within the game. In yet another example, the input can be navigational input to transition the user to a discussion thread hosted within the game. At 570, in response to navigational input obtained from the player, the discussion thread can be retrieved and displayed. The player can read, respond, collaborate, or otherwise participate in the discussion thread. At 580, player input (e.g., posts, etc.) can be incorporated into the discussion thread.

While FIG. 5 depicts individual input handling paths, it is to be appreciated that such depiction is a simplification to provide a high level overview of potential actions, scenarios, and responses within a game instance of advisory services network gaming platform. For instance, while viewing an item of evidence at 530, the player can provide input for which a game response is to navigate to discussion thread, at 570, associated with or related to the item of evidence. Accordingly, the player is not limited to merely adding the item of evidence to the dossier as a multitude of actions can be taken upon viewing the item of evidence. In another example, submitting a solution, at 560, can start a discussion thread which is navigated to at 570. The game can continue to loop as shown in FIG. 5, wherein the player continues to navigate the narrative, provide input, participate in discussions, etc., until the player exits the game and/or a ending point within the game is reached.

Referring to FIG. 6, an exemplary, non-limiting illustration of a user interface of a gaming environment of an advisory services network. The user interface can be deployed on a standalone application executing on an operating system of a computer or as web-based application executing on a web server and accessed via a web browser. As shown in FIG. 6, the user interface can include a wide array of sections presenting a variety of information. At 600, a logo or name of the system (e.g., "Advisory Services Network") can be displayed along with a name of specific game instance or narrative. In a specific, non-limiting example, the narrative name can be a name or identity of an organization whose complex problem is modeled by the game instance. In another example, the narrative name can be more descriptive and hint or suggest the complex problem of the organization.

At 602, an indication of time remaining in the game can be displayed. The organization with the complex problem can have a time limit by which it would desire a potential solution to be presented. Such time limit can translate into time duration of the game as shown at 602. At 604, a header portion with header information can be presented. In FIG. 6, header information, in a specific, non-limiting example, can include a greeting and a rank provided to the player in the game. At 606, the player's score can be shown. The score can be utilized to indicate a significance of a player's contribution in the game and/or to serve as a basis to distribute intrinsic and extrinsic rewards to the player. As discussed in greater detail below, the game can include a cascading points system whereby the player's score is a function of the player's actions as well as independent actions of other players referencing the player's actions. In an example, clicking on the score, at 606, can display details on the scoring rules as well as details of point accumulation.

At 608, various game support functions can be presented as a series of buttons. For instance, support functions, when selected, can open up modal displays with appropriate controls. As shown in FIG. 6, some exemplary support functions include a leaderboard function, a feedback function, and a help function. At 610, navigational breadcrumbs are depicted. The navigational breadcrumbs serve a dual purpose. Not only do the navigational breadcrumbs indicate a current scene viewed by the player, but the navigational breadcrumbs also depict the choices or path taken by the player to arrive at the current scene. At 612, a list of other players who have played through the current scene. As shown in FIG. 6, and in accordance with one exemplary, non-limiting embodiment, the list of players can be depicted as a series of thumbnail images of avatars or other identifiers associated with the players. This information can enable a player to research other choices, actions, or input from other players regarding the current scene and evidence.

In FIG. 6, numeral 614 indicates a main content portion of the user interface. Within the main content portion, a scene title (616) can be displayed along with any imagery related to the scene, shown as a primary image at 618 with alternative thumbnail images at 620. Further, a scene narrative, shown at 622, can be presented along with a scrollbar if the narrative extends beyond a viewable pane of the user interface.

At 624, a related evidence tab is displayed, which can be activated to display a list of evidence supporting the current scene. The tab label, as shown in FIG. 6, can provide an indication of a number of evidence items as well as an indication of a number of discussion threads related to the evidence items. At 626, a dossier tab is depicted which enables access to the player's dossier. The tab label of the dossier tab indicates a number of items included in the player's dossier as well as a number of discussions pertaining to the player's dossier. At 628, a series of navigational options are provided to the player. The navigational options present scenes to which the player can navigate to from the current scene.

Figure 7:
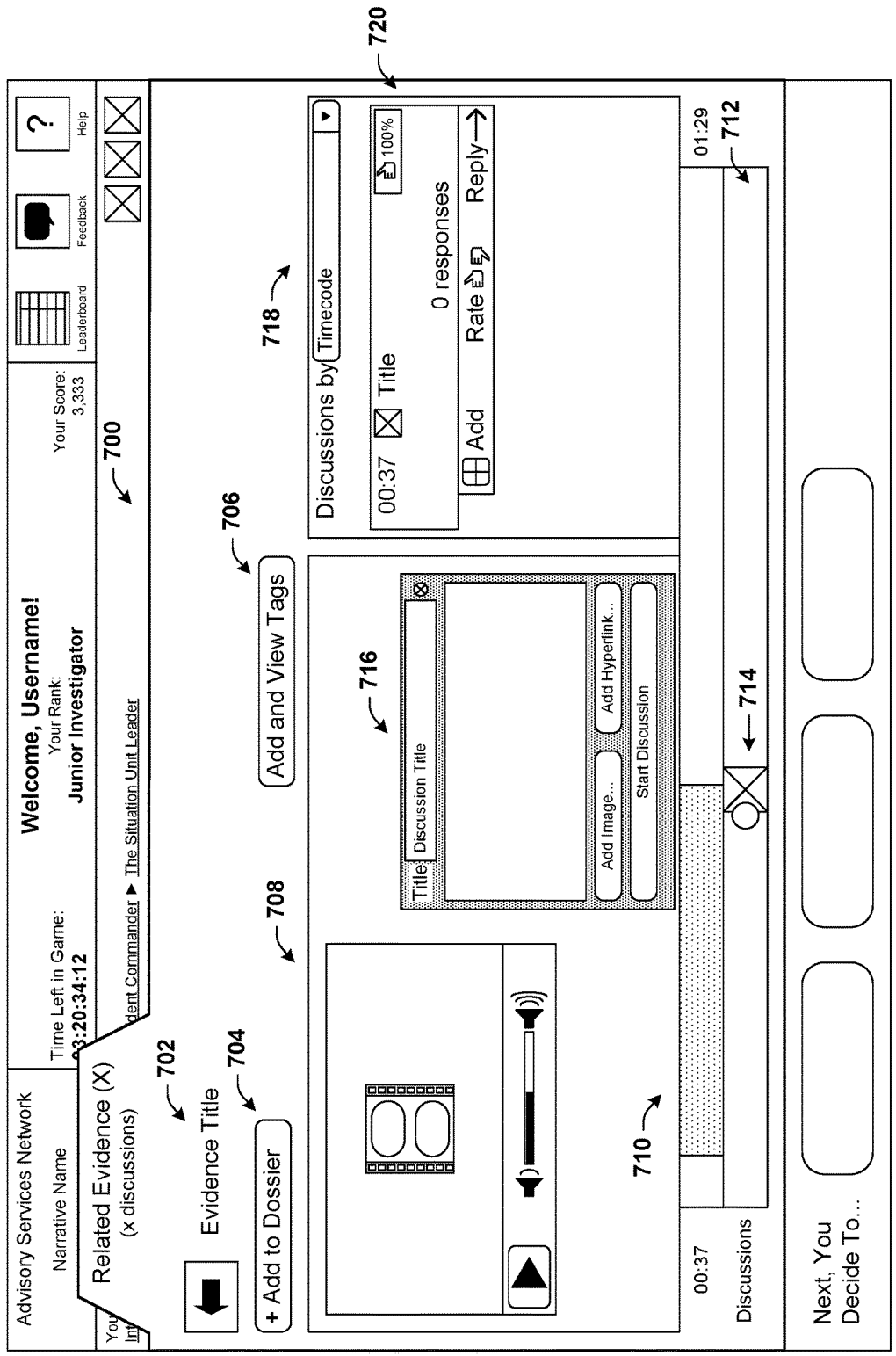
FIG. 7 is an exemplary, non-limiting illustration of a user interface of a network game within a gaming environment according to one or more embodiments.

FIG. 7 is an exemplary, non-limiting illustration of a user interface of a network game within a gaming environment according to one or more embodiments. This illustration is provided to highlight and describe embodiments and features related to viewing evidence within the gaming environment. It is to be appreciated that alternative user interfaces can be devised to accomplish the functionality described herein.

FIG. 7, in particular, shows a simplified user interface placed with a context of an exemplary user interface for the advisory services network game as described previously with reference to FIG. 6. As shown in FIG. 7, a display or panel 700 of a related evidence tab can slide over the interface for the game when activated. Panel 700 can include a title 702 of an item of evidence displayed as well as a control 704 to add the item of evidence to a dossier and a control 706 to add labels to the item of evidence or view labels already attached. An evidence display portion 708 can display the item of evidence, which is a video in the example user interface of FIG. 7. A timeline 710 associated with the video can be utilized to select a portion of the video (e.g., from time 00:37 to time 01:29). The selected portion can be tagged or included in a discussion via a discussion timeline 712 which includes a tag 714 indicating the portion of video extracted for discussion. The tag 714 can include a thumbnail image or avatar associated with the player extracting the portion and/or starting the discussion. When tagging a portion of evidence (video) for discussion, a pop-up 716 that includes controls to enter a discussion title and a discussion comment, add an image, add a hyperlink, add a tag to the discussion, and/or create the discussion thread. A discussion portion 718 of panel 700 can list discussion threads associated with the evidence displayed in panel 700. A control is provided to arrange available discussion by time, title, user, number of responses, rating, etc. FIG. 7 shows a discussion thread 720 in the list of threads. As shown, discussion thread 720 can specify a title, a rating (e.g., 100% votes are positive), a timestamp of the video portion, and various controls to up vote, down vote, reply, etc.

The aforementioned embodiments of an advisory service network and associated gaming platform are intended to provide a general overview of a potential environment in which to implement and deploy the embodiments and features of a video viewing and tagging system described below.

Viewing and Tagging Video in a Network Game

As mentioned above, a video viewing and tagging system is a mechanism of the advisory services network in which players can mark and save a point in time of a video, a segment of the video, or an entirety of the video. The video viewing and tagging system further enables the players to apply specific attributes or tags to the video, the segment, or point in time. The specific attributes and tags facilitate sharing of video portions among players, effective searching of videos related to particular concepts, efficient retrieval and review of videos, etc., where the videos manipulated by the video viewing and tagging system and stored in the advisory services network pertain to a complex problem that the advisory services network is deployed to solve.

With the video viewing and tagging system, players of a game deployed on the advisory services network can, while reviewing a video included as evidence within the game, extract a segment of the video by specifying a start time and a stop time of the segment or selecting a portion along a video timeline. The extracted segment can be tagged, e.g., apply a label, shared with other players, added to a dossier, etc. For instance, a player can mark a section of video and input a comment about the section which starts a discussion thread that other players can review, participate in, and expand. Through the discussion thread, the other players can share other video segments (e.g., related to information they have discovered and collected) with players. In an example, the other video segments can be embedded into the discussion thread, which is already created and on-going. Through these mechanisms provided by the video viewing and tagging system, networks of interlinked video segments and comments develop which enable broad patterns to come alive and robust solutions to be generated.

Tags can be applied to videos and video segments to facilitate categorization, identification, and searchability of videos and video segments. Default tags can be supplied by the advisory services network and players can add custom tags to further increase categorization, identification, and searchability. In addition, tags can be utilized to provide additional information about videos and video segments themselves, or to search for related media. For example, a player can tag a video segment to provide additional background data on the video segment that was removed during editing. In another example, the video viewing and tagging system facilitates capture and communication of a perspective of an individual player on the complex problem and/or potential solutions. For instance, tags can be employed to detail what a video segment represents to the player.

Figure 8:
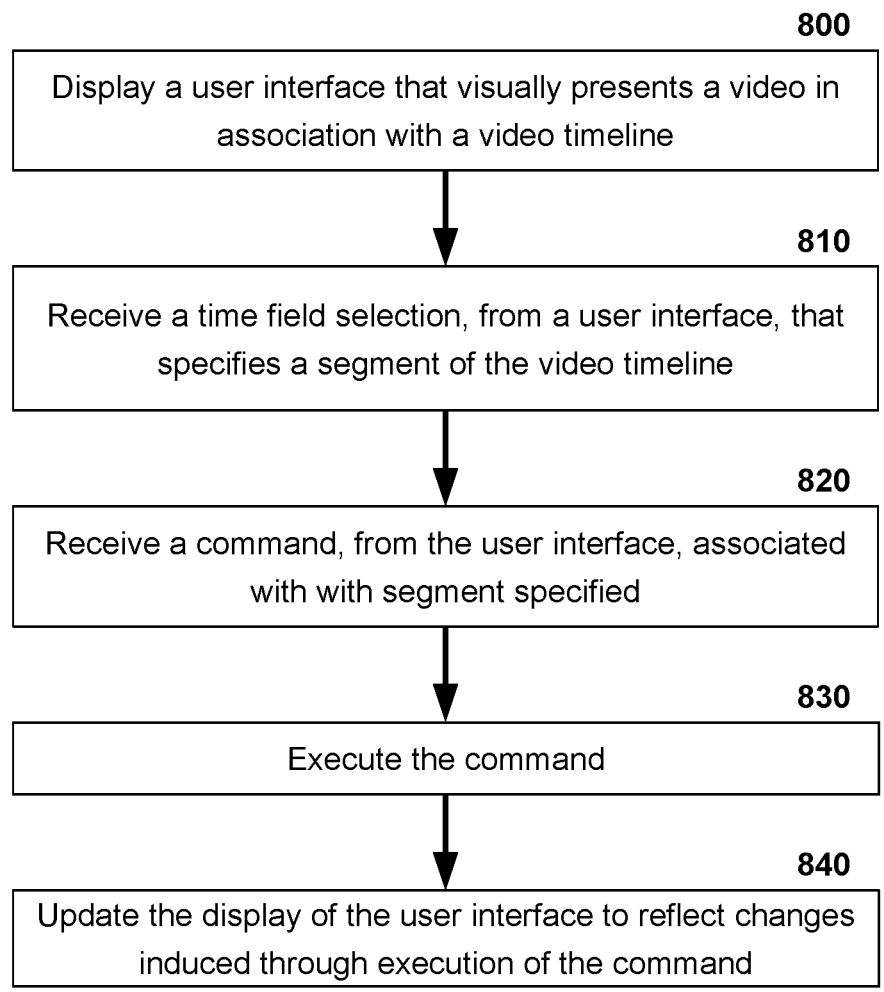
FIG. 8 illustrates a flow diagram of an exemplary, non-limiting embodiment for manipulating a video visually presented on a user interface.

With respect to one or more non-limiting aspects of the advisory services network game with a video viewing and tagging system as described above, FIG. 8 shows a flow diagram of an exemplary, non-limiting embodiment for manipulating a video visually presented on a user interface. Starting at 800, a user interface visually presenting a video in association with a video timeline is displayed. At 810, a time field selection is received, from the user interface. In a specific, non-limiting example, the time field selection can specify a segment of the video. For instance, the time field selection can indicate a start time and an end time of the segment and input via the video timeline presented on the user interface. At 820, a command is received, from the user interface, that is associated with the segment specified by the time field selection. In a particular example, the command indicates an operation to be performed on the segment. At 830, the command is executed, thus performing the operation on the segment. At 840, the display of the user interface is updated to reflect changes induced through execution of the command.

Figure 9:
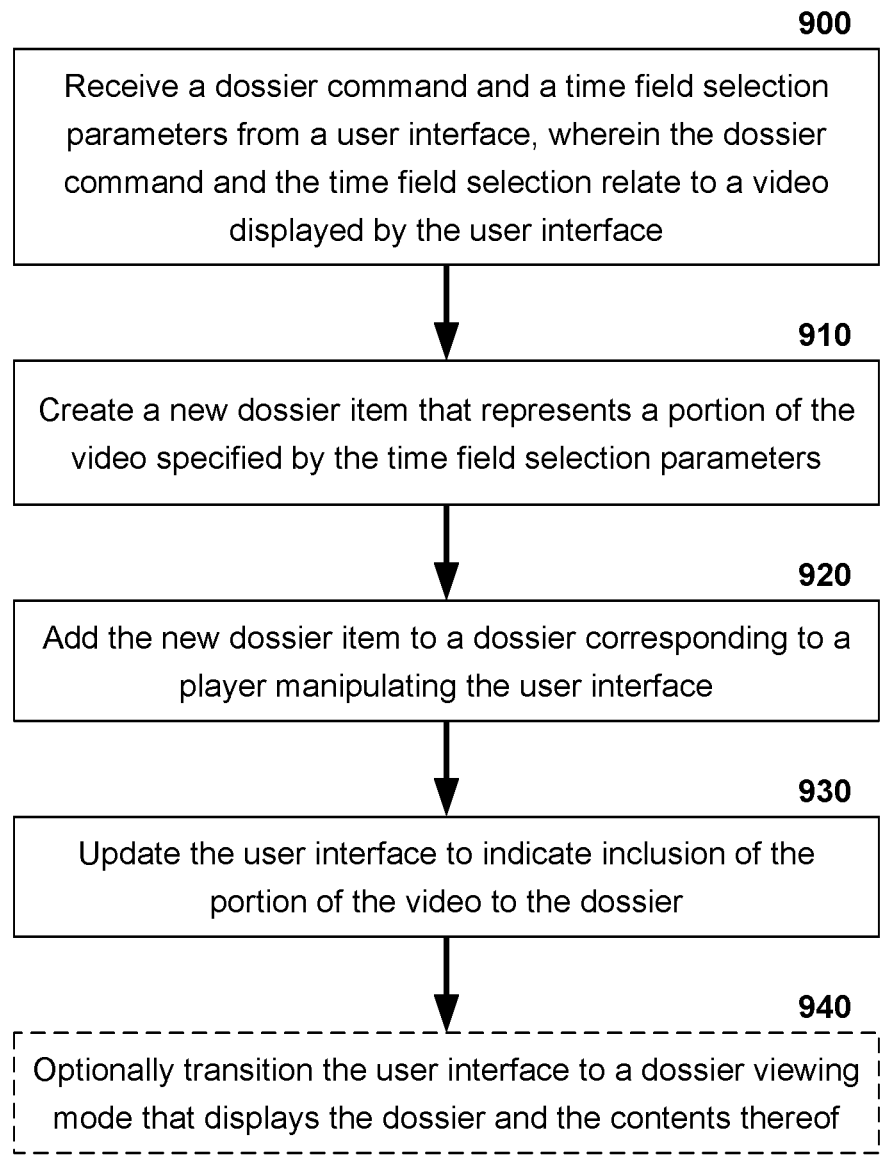
FIG. 9 is a flow diagram of an exemplary, non-limiting embodiment for extracting a segment of a video visually presented on a user interface and adding the segment to a digital dossier.

FIG. 9 illustrates a flow diagram of an exemplary, non-limiting embodiment for extracting a segment of a video visually presented on a user interface and adding the segment to a digital dossier. A digital dossier (also referred to herein as a "dossier" or an "advisory services network dossier"), according to one aspect, is a mechanism of an advisory services network to encapsulate a perspective or view, of a complex problem, of a specific players from a diverse group of individuals participating in crowd sourcing via a game instance on the advisory services network. The dossier can capture a player's perspective which is influenced by the background, experiences, skills, etc. of the player. Accordingly, with a large and diverse group of players, the resultant set of dossiers provides a variety of viewpoints which facilitates articulation of root problems and launch pads for high-quality solutions to those root problems. In a specific, non-limiting example, the dossier functions as a personal collection of evidence items built by a player of the game on the advisory services network. The player can review evidence items (such as evidence items stored in evidence store 412 shown in FIG. 4) related to a complex problem and select specific items which the player believes best represents the complex problem. The dossier enables the player to build a case on the complex problem by adding evidence to the dossier, removing evidence from the dossier, organizing evidence in the dossier, tagging evidence in the dossier, annotating evidence in the dossier, etc. The dossier can be shared with other players and/or experts also participating in the advisory services network.

Starting at 900, a dossier command and a time field selection parameters are received from a user interface. The time field selection parameters can specify a portion or segment of a video presented on the user interface and the dossier command can indicate a dossier-related operation to be performed on the portion of the video. At 910, a new dossier item is created, wherein the new dossier item represents the portion of the video specified by the time field selection parameters. In one example, the dossier item can include a duplicated copy of the portion of the video. In another embodiment, the dossier item can include a reference to the portion of the video such that the dossier item can be utilized to initiate playback (e.g., retrieval and presentation) of only the portion of the video specified by the time field selection parameters and included, by reference, in the dossier item.

At 920, the new dossier item is added to a dossier corresponding to a player manipulating the user interface to generate the time field selection parameters and the dossier command. In accordance with an embodiment the dossier can be a data structure, containing dossier items (e.g., representations of evidence, videos, or portions thereof selected by a player), retained in data storage in association with an identity of the player (e.g., username, player ID, etc.). At 930, the user interface is updated to indicate inclusion of the portion of the video to the dossier. Optionally, at 940, the user interface can transition to a dossier viewing mode that displays the dossier and the contents thereof.

Figure 10:
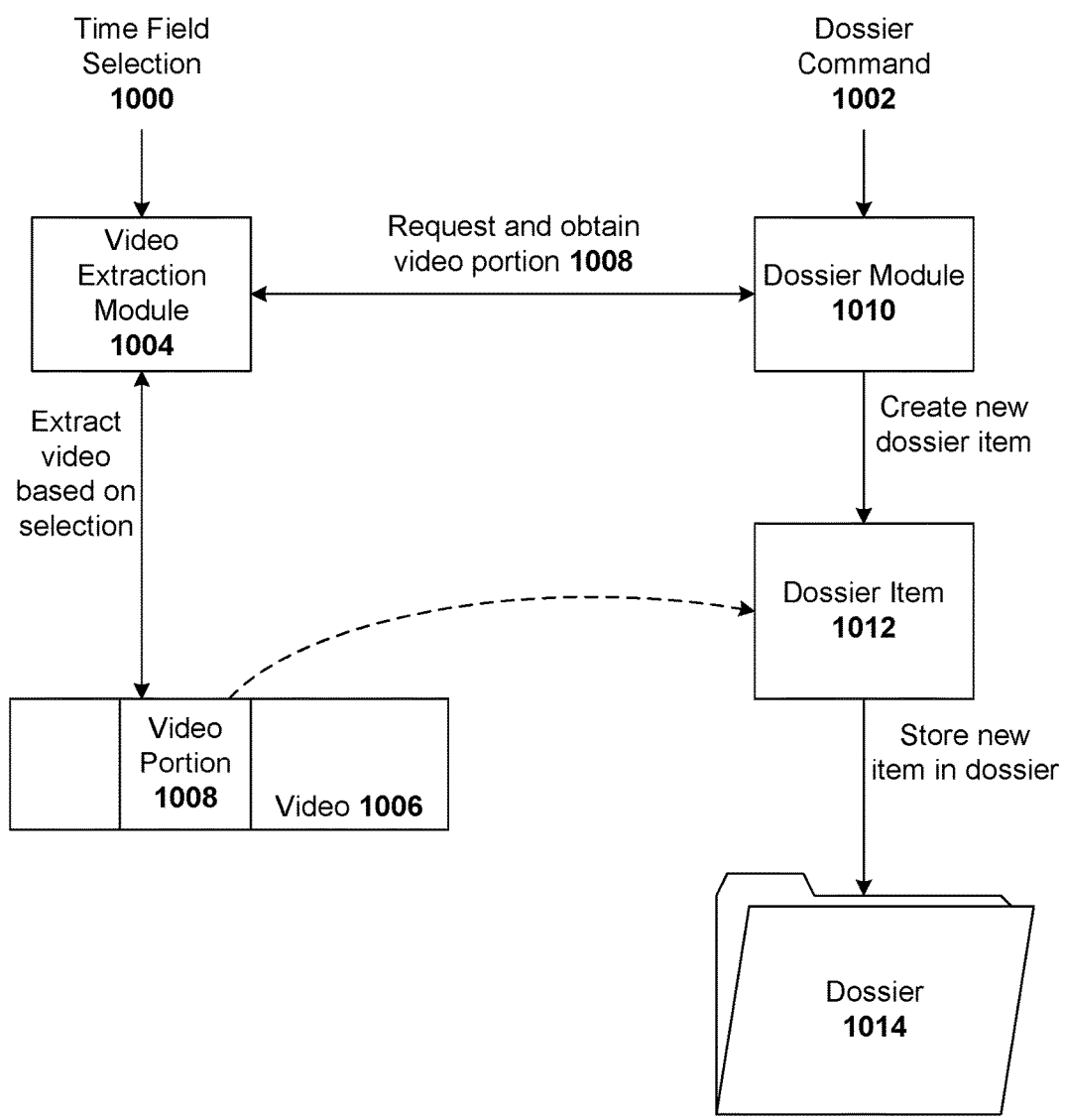
FIG. 10 is a block diagram illustrating an exemplary, non-limiting act of adding a portion of a video to a digital dossier.

FIG. 10 is a block diagram illustrating an exemplary, non-limiting act of adding a portion of a video to a digital dossier. According to an example, FIG. 10 illustrates at least the method described above with reference to FIG. 9. As shown in FIG. 10, a time field selection 1000 can be received by video extraction module 1004 from, for example, a user interface being manipulated by a player. Video extraction module 1004, based upon time field selection 1000, extracts video portion 1008 from video 1006, wherein video 1006 is visually presented by the user interface conveying time field selection 1000. Similarly, a dossier module 1010 obtains a dossier command 1002 from the user interface. In response to dossier command 1002, dossier module 1010 can request and obtain video portion 1008 extracted by video extraction module 1004. Dossier module 1010 generates a dossier item 1012 which incorporates video portion 1008 as shown in FIG. 10. Dossier item 1012 can include a copy of video portion 1008 or can incorporate video portion 1008 by reference, such that playback of dossier item 1012 involves retrieving video 1006 but only playing video portion 1008 in accordance with information retained by dossier item 1012. As shown in FIG. 10, dossier item 1012 can be retained in a dossier 1014.

Figure 11:
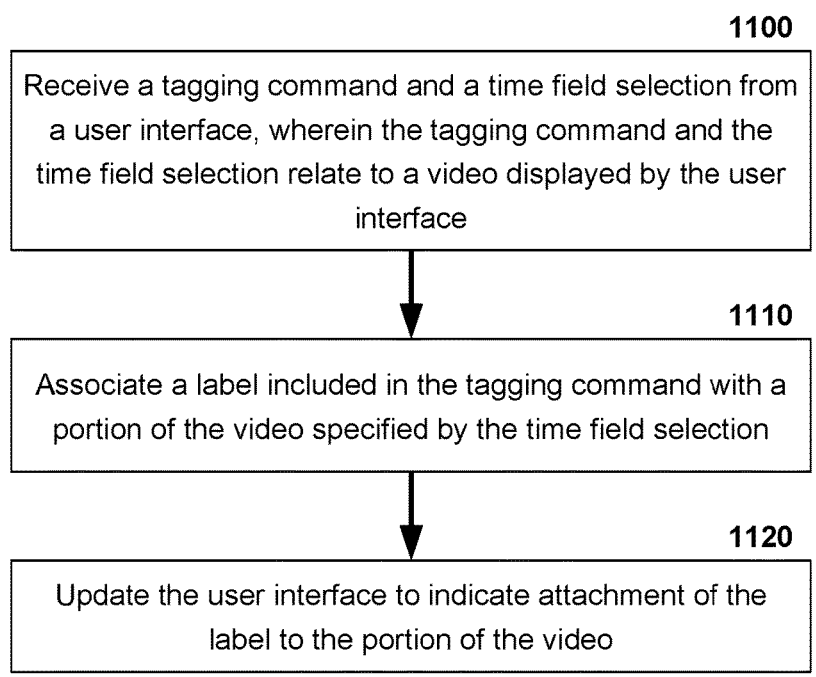
FIG. 11 is a flow diagram of an exemplary, non-limiting embodiment for tagging a portion of a video.

FIG. 11 is a flow diagram of an exemplary, non-limiting embodiment for tagging a portion of a video. Starting at 1100, a tagging command and a time field selection are received from a user interface. The time field selection can specify a portion or segment of a video presented on the user interface and the tagging command can indicate an operation to attach a label to the portion of the video. At 1110, a label, included in the tagging command, is associated with the portion of the video specified by the time field selection. At 1120, the user interface is updated to indicate application of the label to the portion of the video.

Figure 12:
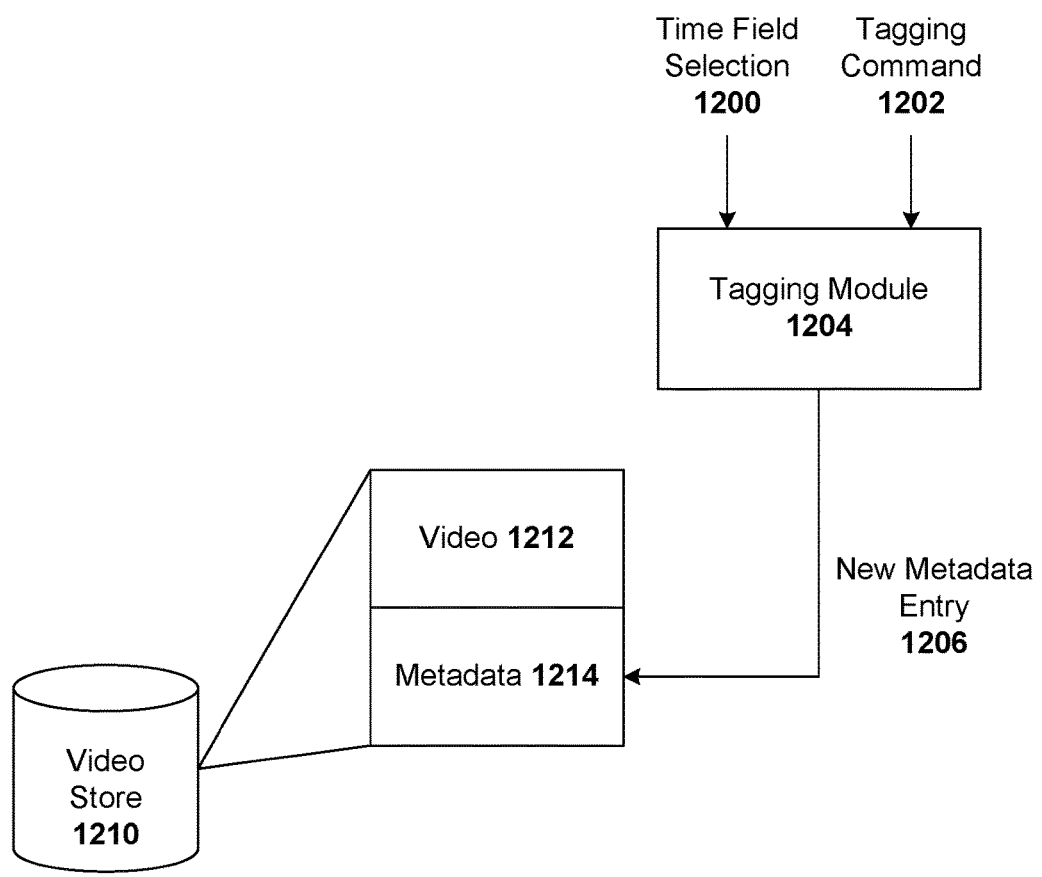
FIG. 12 is a block diagram illustrating an exemplary, non-limiting act of tagging a portion of a video.

FIG. 12 is a block diagram illustrating an exemplary, non-limiting act of tagging a portion of a video. According to an example, FIG. 12 illustrates at least the method described above with reference to FIG. 11. As shown in FIG. 12, a tagging module 1204 obtains a time field selection 1200 and a tagging command 1202 from a user interface (not shown). Tagging command 1204 can generate a new metadata entry 1206, which is added to metadata 1214 associated with video 1212 visually presented by the user interface and stored in a video store 1210 along with a plurality of disparate videos. In accordance with an example, metadata entry 1206 can include information that specifies a portion of video 1212, according to time field selection 1200, and a label or tag, included in tagging command 1202, associated to the portion of video 1212. In a further example, metadata 1214 can include numerous metadata entries such as metadata entry 1206 described above. In this manner, metadata 1214 can include information that specifies a plurality of disparate segments of video 1212 with distinct sets of labels respectively applied thereto.

Figure 13:
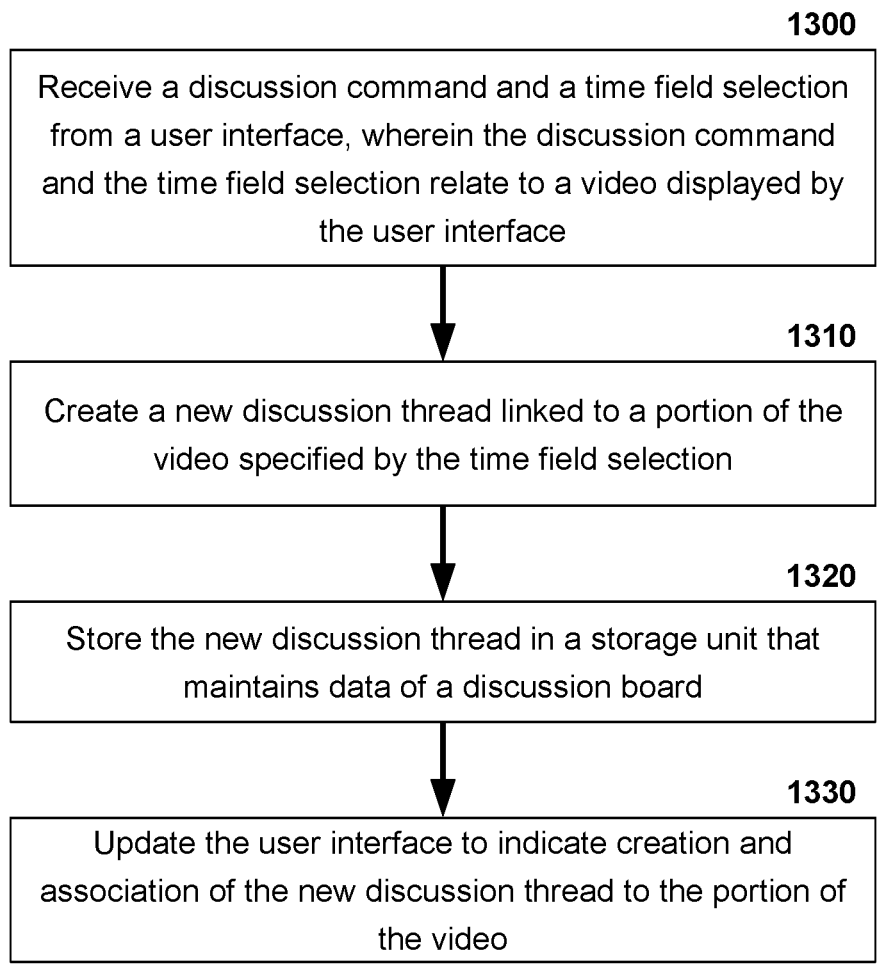
FIG. 13 is a flow diagram of an exemplary, non-limiting embodiment for selecting a portion of a video and creating a discussion about the portion of video.

FIG. 13 is a flow diagram of an exemplary, non-limiting embodiment for selecting a portion of a video and creating a discussion about the portion of video. Starting at 1300, a discussion command and a time field selection are received from a user interface. The time field selection can specify a portion or segment of a video presented on the user interface and the discussion command can indicate an operation to create a discussion thread based upon the portion of the video. At 1310, a new discussion thread is created, wherein the discussion thread is linked to the portion of the video specified by the time field selection. At 1320, the new discussion thread is stored in a storage unit that maintains data of a discussion board hosting the discussion thread. At 1330, the user interface is updated to indicate creation and association of the new discussion thread to the portion of the video.

Figure 14:
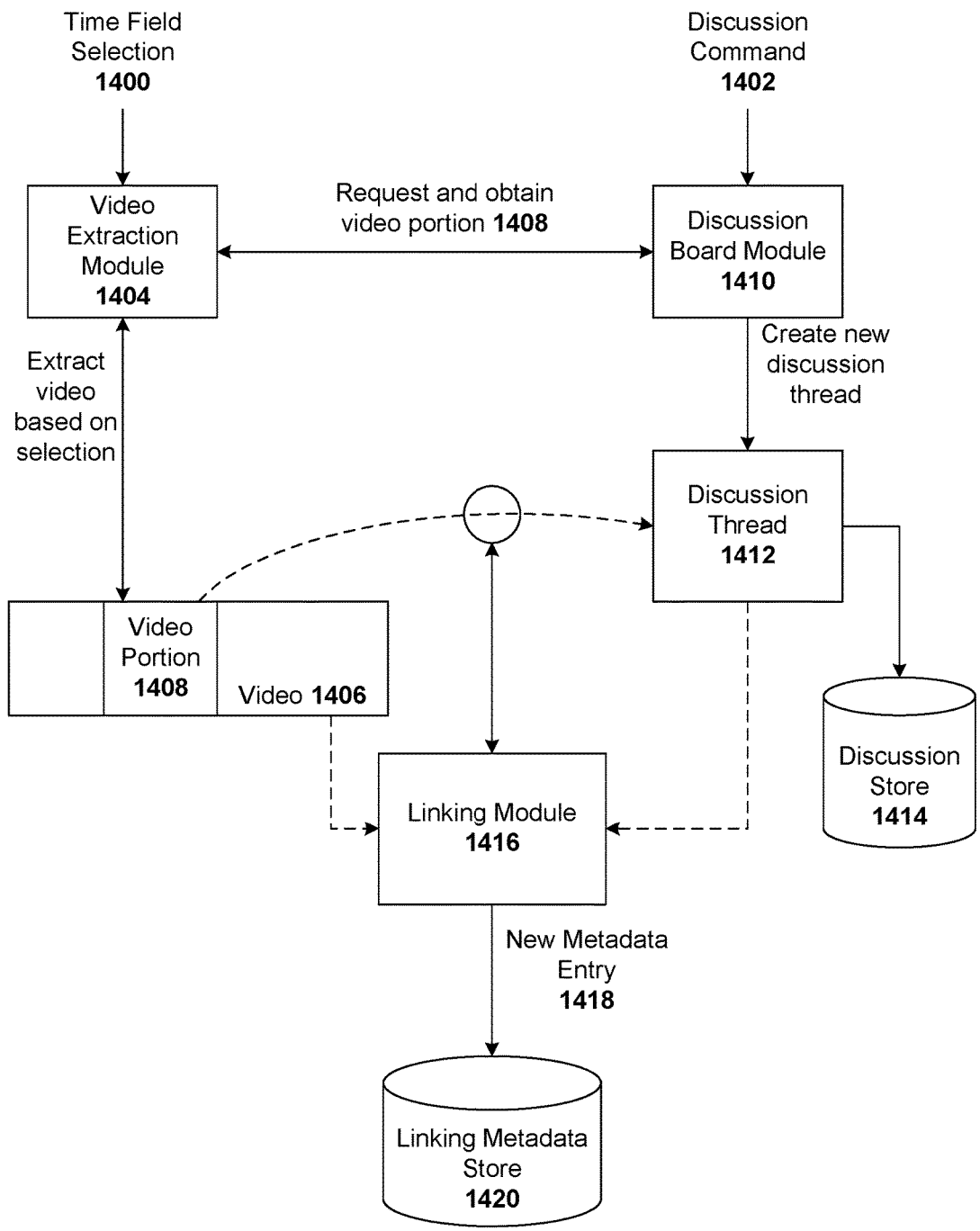
FIG. 14 is a block diagram illustrating an exemplary, non-limiting act of creating a discussion thread from an extracted portion of a video.

FIG. 14 is a block diagram illustrating an exemplary, non-limiting act of creating a discussion thread from an extracted portion of a video. According to an example, FIG. 14 illustrates at least the method described above with reference to FIG. 13. As shown in FIG. 14, a time field selection 1400 can be received by video extraction module 1404 from, for example, a user interface being manipulated by a player. Video extraction module 1404, based upon time field selection 1400, extracts video portion 1408 from video 1406, wherein video 1406 is visually presented by the user interface that conveyed time field selection 1400.

Similarly, a discussion board module 1410 obtains a discussion command 1402 from the user interface. In response to discussion command 1402, discussion board module 1410 can request and obtain video portion 1408 extracted by video extraction module 1404. Discussion board module 1410 generates a discussion thread 1412 to create a new discussion around video portion 1408 as shown in FIG. 14. Discussion thread 1412 can include, in addition to an initial comment, a copy of video portion 1408 or a reference to video portion 1408 that can be followed to commence playback. As shown in FIG. 14, discussion thread 1412 can be retained in a discussion store 1414.

Further, a linking module 1416 is illustrated in FIG. 14, wherein the linking module 1416 is configured to generate new metadata entry 1418 that specifies the relationship between video portion 1408 (and/or video 1406) and the newly created discussion thread 1412. For instance, linking module 1416 can obtain an identifier for video 1406 from video extraction module 1404 as well as information identifying video portion 1408 as specified by time field selection 1400. Further, linking module 1416 can obtain an identifier, from discussion board 1410, for discussion thread 1412 created by discussion board module 1410 and stored in discussion store 1414. New metadata entry 1418 can associate the identifier of discussion thread 1412 with the identifier of video 1406 and, through inclusion of the information identifying video portion 1408, further tie discussion thread 1412 specifically to video portion 1408 of video 1406. As shown in FIG. 14, metadata entry 1418 newly generated by linking module 1416 can be stored in linking metadata store 1420.

Figure 15:
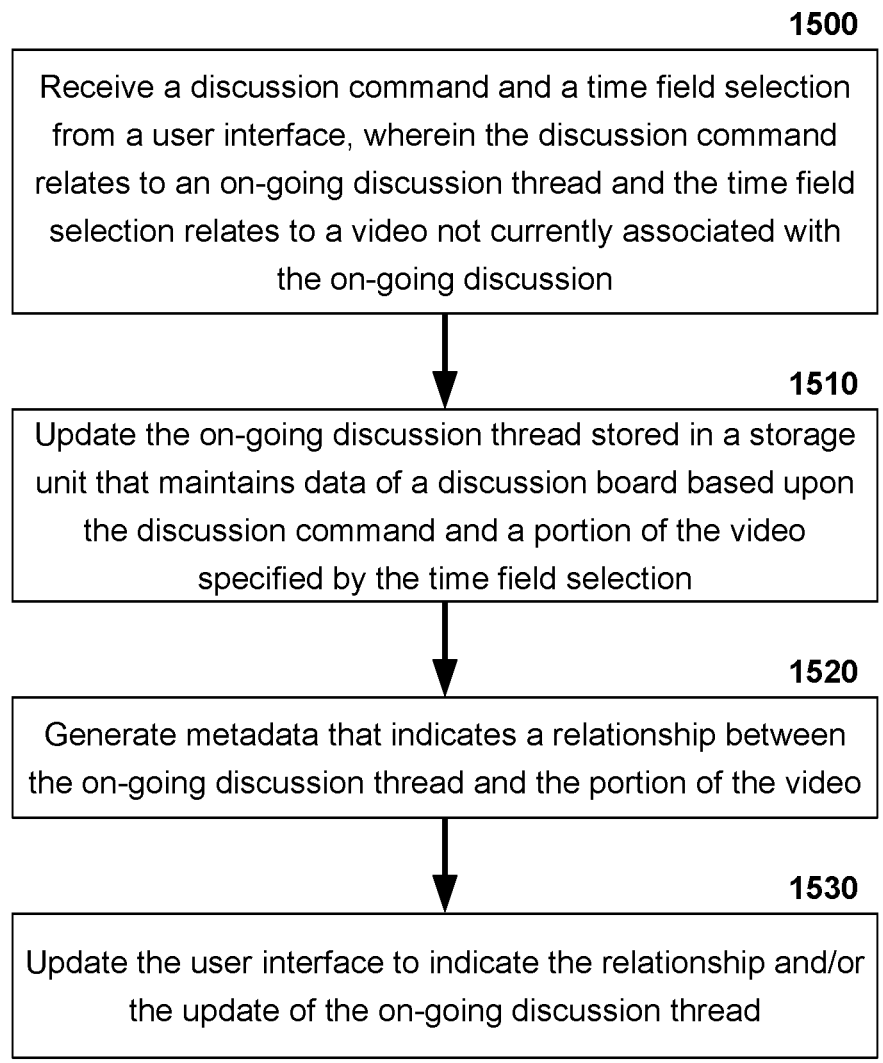
FIG. 15 is a flow diagram of an exemplary, non-limiting embodiment for linking a portion of a video to an on-going discussion thread.

FIG. 15 is a flow diagram of an exemplary, non-limiting embodiment for linking a portion of a video to an on-going discussion thread. Starting at 1500, a discussion command and a time field selection are received from a user interface. The discussion command relates to an operation to be performed in regard to an on-going discussion thread and the time field selection relates to a video not currently associated with the on-going discussion. At 1510, the on-going discussion thread is updated based upon the discussion command and a portion of the video specified by the time field selection. In an example, the on-going discussion can be stored in a storage unit that maintains data of a discussion board hosting the on-going discussion thread. At 1520, metadata is generated that indicates a relationship between the on-going discussion thread and the portion of the video. At 1530, the user interface is updated to indicate the new relationship or to reflect the update to the on-going discussion thread.

Figure 16:
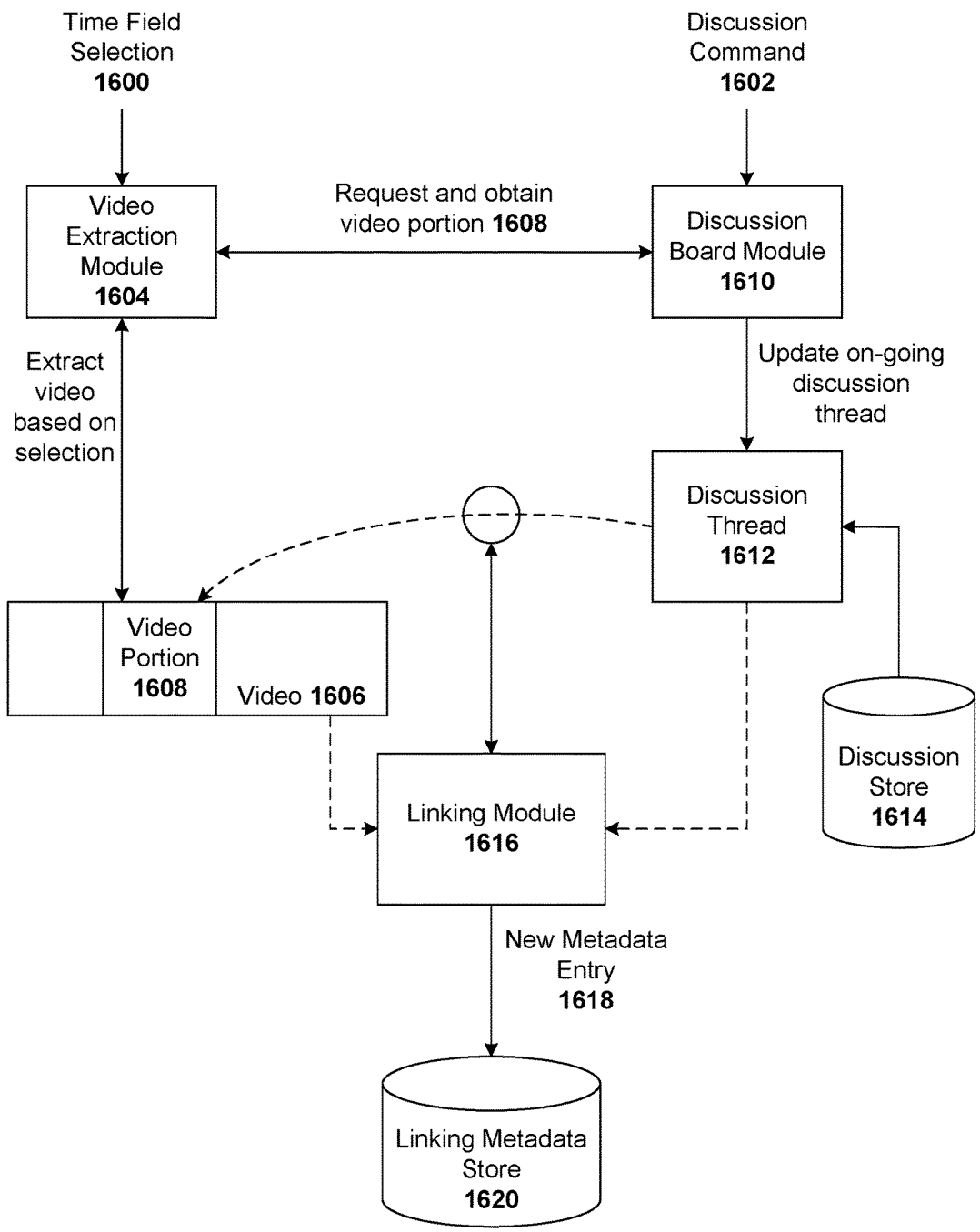
FIG. 16 is a block diagram illustrating an exemplary, non-limiting act of extracting a portion of video and attaching the portion to an on-going discussion thread.

FIG. 16 is a block diagram illustrating an exemplary, non-limiting act of extracting a portion of video and attaching the portion to an on-going discussion thread. According to an example, FIG. 16 illustrates at least the method described above with reference to FIG. 15. As shown in FIG. 16, a time field selection 1600 can be received by video extraction module 1604 from, for example, a user interface being manipulated by a player. Video extraction module 1604, based upon time field selection 1600, extracts video portion 1608 from video 1606. Similarly, a discussion board module 1610 obtains a discussion command 1602 from the user interface. The discussion command 1602 can relate to an on-going discussion thread stored in discussion store 1614 such as, for example, discussion thread 1612. Discussion thread 1612 can be associated with one or more videos or video segments. However, according to an aspect, discussion thread 1612 is not associated with either video 1606 or video portion 1608. Further to this example, discussion command 1602 can specify an operation to include (e.g., incorporate, reference, etc.) video portion 1608 into discussion thread 1612 which is pre-existing and on-going.

In response to discussion command 1602, discussion board module 1610 can update discussion thread 1612 by incorporating a comment from discussion command 1602 and a copy of or reference to video portion 1608. In other words, discussion board module 1610 adds the comment and video portion 1608 to the discussion. A linking module 1616 generates new metadata entry 1618 that specifies the relationship between video portion 1608 (and/or video 1606) and discussion thread 1612. In an example, metadata entry 1618 can be similar to metadata entry 1418 described above with reference to FIG. 14. As shown in FIG. 16, metadata entry 1618 newly generated by linking module 1616 can be stored in linking metadata store 1620.

Figure 17:
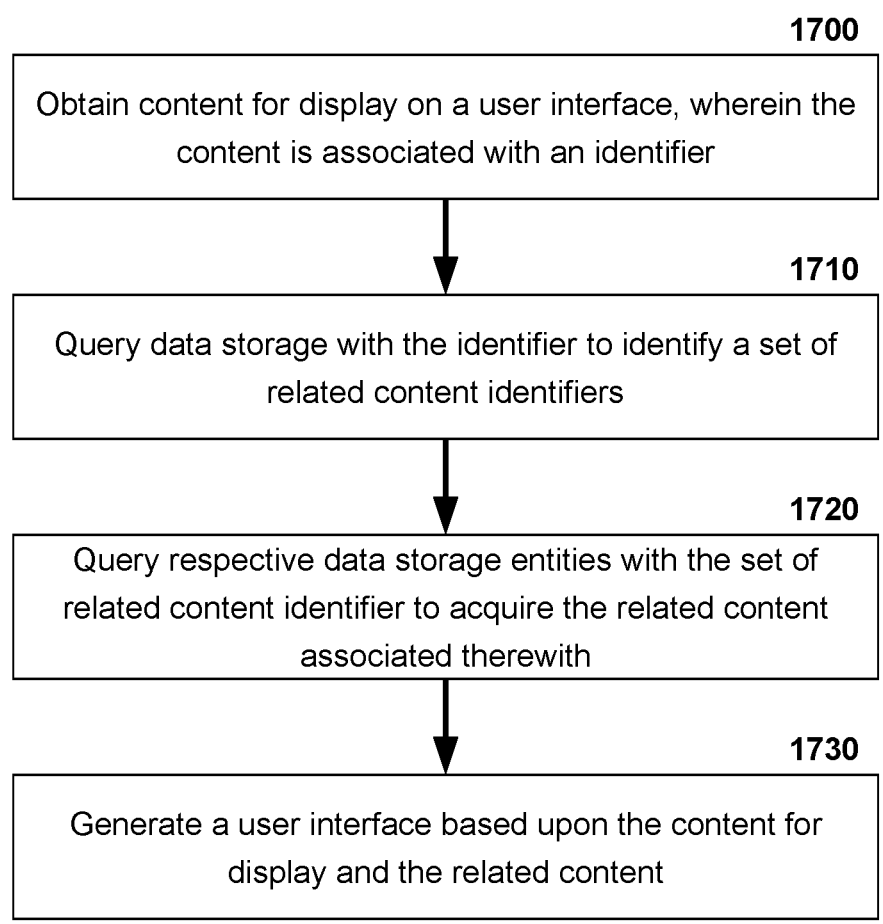
FIG. 17 illustrates a flow diagram of an exemplary, non-limiting embodiment for generating a dynamic user interface with information from a plurality of information sources.

FIG. 17 illustrates a flow diagram of an exemplary, non-limiting embodiment for generating a dynamic user interface with information from a plurality of information sources. At 1700, content for display on a user interface is obtained. In an embodiment, the content for display is associated with an identifier. In a specific, non-limiting example, the content for display can be a video. As such, the identifier can include identification information (e.g., an index, a key, etc.) that corresponds to the video. At 1710, data storage is queried with the identifier associated with the content for display to identify a set of related content identifiers. The set of related content identifiers can include identification information of a set of related content, which is content linked to the content for display. At 1720, respective data storage entities are queried with identifiers from the set of related content identifiers to acquire the related content associated therewith. At 1730, a user interface is generated based upon the content for display and the related content.

Figure 18:
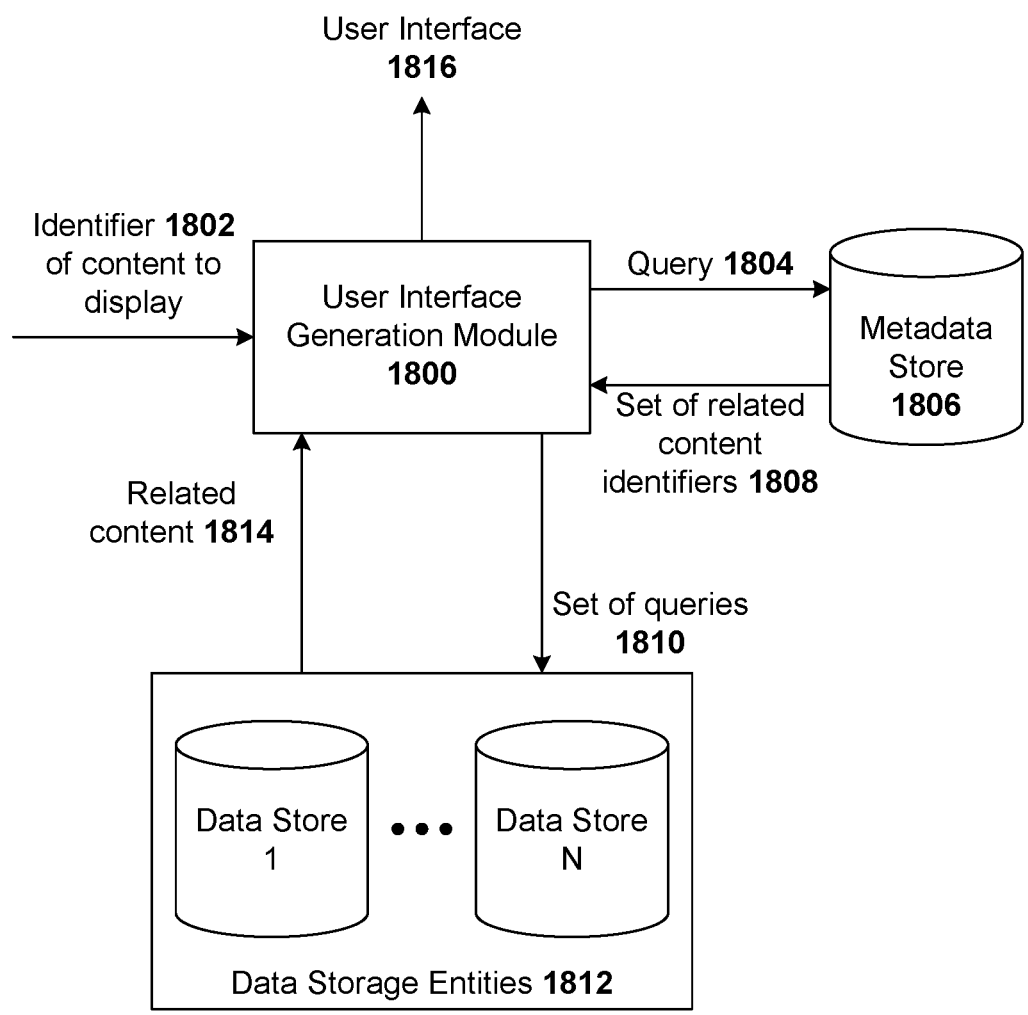
FIG. 18 is a block diagram illustrating an exemplary, non-limiting act of creating a user interface as a composite of disparate information from a plurality of sources.

FIG. 18 illustrates a block diagram of an exemplary, non-limiting act of generating a user interface from a plurality of related content. According to an example, FIG. 18 illustrates at least the method described above with reference to FIG. 17. As shown in FIG. 18, a user interface generation module 1800 obtains an identifier 1802 of content to display. User interface generation module 1800 is configured to issue query 1804, based upon identifier 1802, to a metadata store 1806 that retains metadata specifying relationships, e.g., links, between content. The metadata store 1806, in response to query 1804, provides a set of related content identifiers 1808 to user interface generation module 1800. Based upon the set of related content identifiers 1808, the user interface generation module 1800 generates and transmits a set of queries 1810 to data storage entities 1812. Data storage entities 1812 can include a plurality of data stores such as data stores 1 through N, where N is any integer greater than or equal to one. From the data storage entities 1812, user interface generation module 1800 receives related content 1814. Based upon related content 1814 and the content to display, user interface generation module 1800 constructs user interface 1816.

Figure 19:
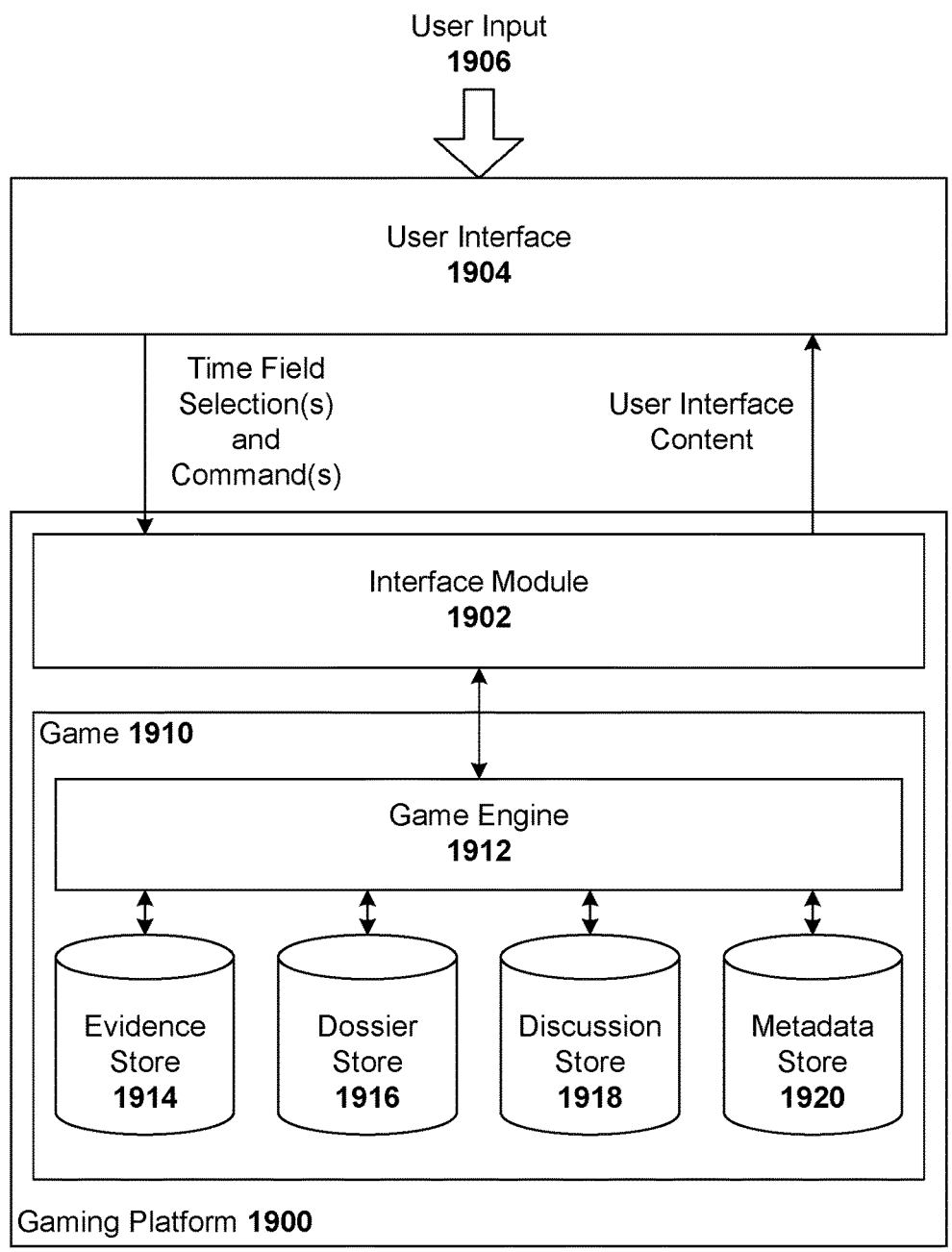
FIG. 19 is a block diagram illustrating an exemplary, non-limiting gaming platform in accordance with one or more embodiments.

Turning now to FIG. 19, illustrated is a block diagram of an exemplary, non-limiting gaming platform in accordance with one or more embodiments. Gaming platform 1900, as shown in FIG. 19, can include an interface module 1902 configured to accept input (e.g., time field selection(s) and command(s)) from a user interface 1904, displayable on a display screen, and to generate and transmit user interface content to user interface 1904 display based on information from gaming platform 1900 and/or associated games deployed thereon. In an example, user interface 1904 can obtain user input 1906 from players (e.g., members of a diverse group) whom interact with gaming platform 1900 through manipulation of user interface 1904. In a specific, non-limiting embodiment, user input 1906 can relate to video segment selections, and desired operations associated therewith, that user interface 1904 converts into time field selection(s) and command(s) transmitted to interface module 1902 of gaming platform 1900.

Gaming platform 1900 can host a plurality of game instances such as game 1910 shown in FIG. 19. Game 1910 can be built around evidence, which can include ethnographic information, a variety of media, documents, case studies, etc., related to a complex problem of a sponsor (e.g., enterprise organization) utilizing gaming platform 1900 to crowd source solutions. The evidence, which in an embodiment, includes a plurality of videos of interviews and discussions on the complex problem acquired via ethnographic techniques. The evidence can be stored in evidence store 1914 of game 1910.

Game 1910, as depicted in FIG. 19, can include a game engine 1912 configured to process user input forwarded to game 1910 by interface module 1902 and generate output provided to interface module 1902, which is subsequently presented on user interface 1904. In other words, game engine 1912 can be a central entity of game 1910 and coordinates, controls, and manages substantially all aspects of game 1910. Game 1910 further includes a plurality of data storage entities such as an evidence store 1914 configured to store videos (and other media types) pertaining to the complex problem, a dossier store 1916 configure to retain digital dossiers respectively associated with players participating in game 1910, a discussion store 1918 configured to retain discussion threads including comments from and interactions among players, and a metadata store 1920 configured to retain linking metadata that specifies relationships between videos and/or segments thereof, stored in evidence store 1914, and discussion threads stored in discussion store 1918.

In accordance with embodiments of the video viewing and tagging system described herein, game 1910 can obtain time field selection(s) and command(s) from user interface 1904 via interface module 1902. Game engine 1912 is configured to execute the command(s) and extract portions of videos based upon the time field selection(s). When executing the command(s), game engine 1912 accesses one or more of evidence store 1914, dossier store 1916, discussion store, 1918, and/or metadata store 1920. In addition, game engine 1912 is configured to generate new information and store the new information in one or more of the aforementioned storage entities.

In a further example, game engine 1912, after executing the command(s), is configured to generate new user interface content which is provided to user interface 1904 via interface module 1902 of gaming platform 1900. When generating new user interface content, game engine 1912 can draw upon the various storage entities. For example, when generating user interface content that includes presentation of a video from evidence store 1914, game engine 1912, in addition to accessing evidence store 1914 to obtain the video, can access metadata store 1920 to identify a set of discussion threads which have been created around and/or reference the video or portions thereof. In a specific, non-limiting embodiment, game engine 1912 can acquire an identifier associated with the video to be presented via user interface 1904 and employ the identifier to query metadata store 1920 to obtain entries associated with, e.g., include, the identifier. The set of discussion threads can be retrieved from discussion store 1918 to generate user interface content that presents the video alongside a listing of the discussion threads from the set of discussion threads.

Figure 20:
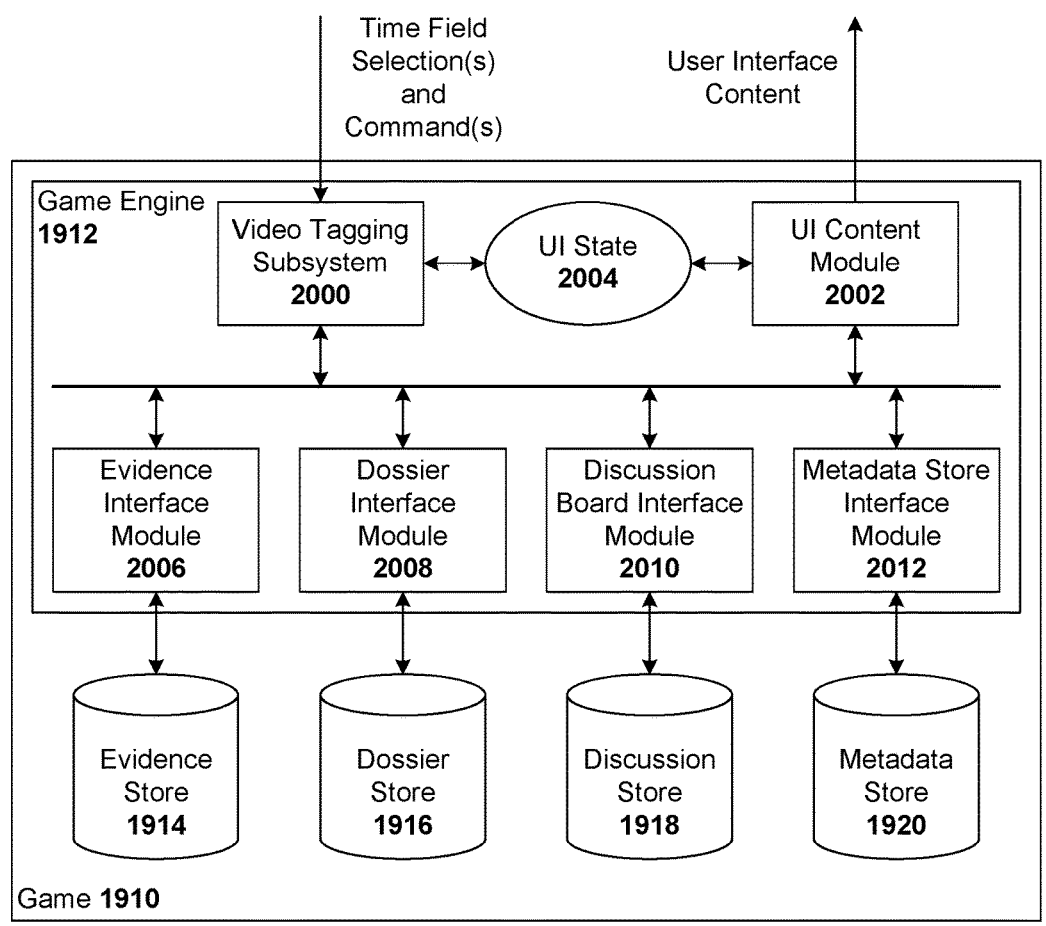
FIG. 20 is a block diagram illustrating an exemplary, non-limiting game and game engine deployed on a gaming platform in accordance with one or more embodiments.

FIG. 20 is a block diagram illustrating an exemplary, non-limiting game and game engine deployed on a gaming platform in accordance with one or more embodiments. More specifically, FIG. 20 depicts a detailed game engine 1912 of game 1910 introduced in FIG. 19. As shown in FIG. 20, game engine 1912 can include a video tagging subsystem 2000 configured to implement one or more embodiments described herein. For instance, video tagging subsystem 2000 can carry other methods described above with reference to FIGS. 8, 9, 11, 13, and 15. In an aspect, video tagging subsystem 2000 obtains time field selection(s) and command(s) and executes the command(s). Game engine 1912 further includes a user interface content module 2002 configured to generate user interface content. As shown in FIG. 20, game engine 1912 can maintain a UI state 2004 utilized by video tagging subsystem 2000 and updated by user interface content module 2002. UI state 2004 can specify a current view of the user interface (e.g., a viewing mode) as well as identification information regarding content of the user interface. For instance, UI state 2004 can include an identifier of a video when the video is presented on the user interface, identifiers associated with discussion threads included on the user interface, an identifier of a dossier displayed on the user interface, etc. The identifiers, in an embodiment, are employed by the video tagging subsystem 2000 and/or user interface content module 2002 to acquire information from various storage entities, such as evidence store 1914, dossier 1916, discussion store 1918, and metadata store 1920 described above.

Game engine 1912 can include a plurality of interface modules such as evidence interface module 2006, dossier interface module 2008, discussion board interface module 2010, and metadata store interface module 2012. In an embodiment, evidence interface module 2006 is configured to retrieve evidence, e.g., videos, from evidence store 1914, store evidence to evidence store 1914, and retrieve and/or update metadata associated with evidence retained in evidence store 1914. Dossier interface module 2008 is configured to retrieve dossiers stored in dossier store 1916 and update dossiers stored in dossier store 1916 (e.g., add items, remove items, modify items, etc.). Discussion board interface module 2010 is configured to retrieve, store, and update discussion threads stored in discussion store 1918. Similarly, metadata store interface module 2012 is configured to retrieve, store, and/or update metadata entries retained in metadata store 1920.

Figure 21:
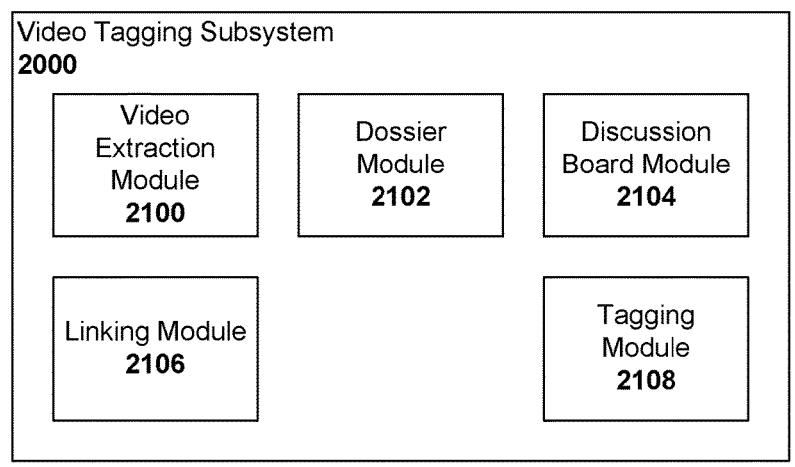
FIG. 21 is a block diagram illustrating an exemplary, non-limiting video tagging subsystem in accordance with one or more embodiments.

FIG. 21 is a block diagram illustrating an exemplary, non-limiting video tagging subsystem according to one or more embodiments. As shown in FIG. 21, video tagging subsystem 2000 described above can include various modules configured to perform functions described herein. For example, video tagging subsystem 2000 can include a video extraction module 2100 configured to extract a segment of a video based upon input parameters such as a start time and an end time of the segment. Video tagging subsystem can also include a dossier module 2102 configured to generate dossier items based upon segments of videos extracted by video extraction module 2100. A discussion board module 2104 is provided which is configured to create new discussion threads around segments of videos or to update existing on-going threads to include segments of videos. A linking module 2106, included in video tagging subsystem 2000, is configured to generate linking metadata that specifies a relationship between segments of videos and discussion threads. Further, video tagging subsystem 2000 can include a tagging module 2108 configured to apply labels, e.g., default labels or custom labels, to segments of videos.

Figure 22:
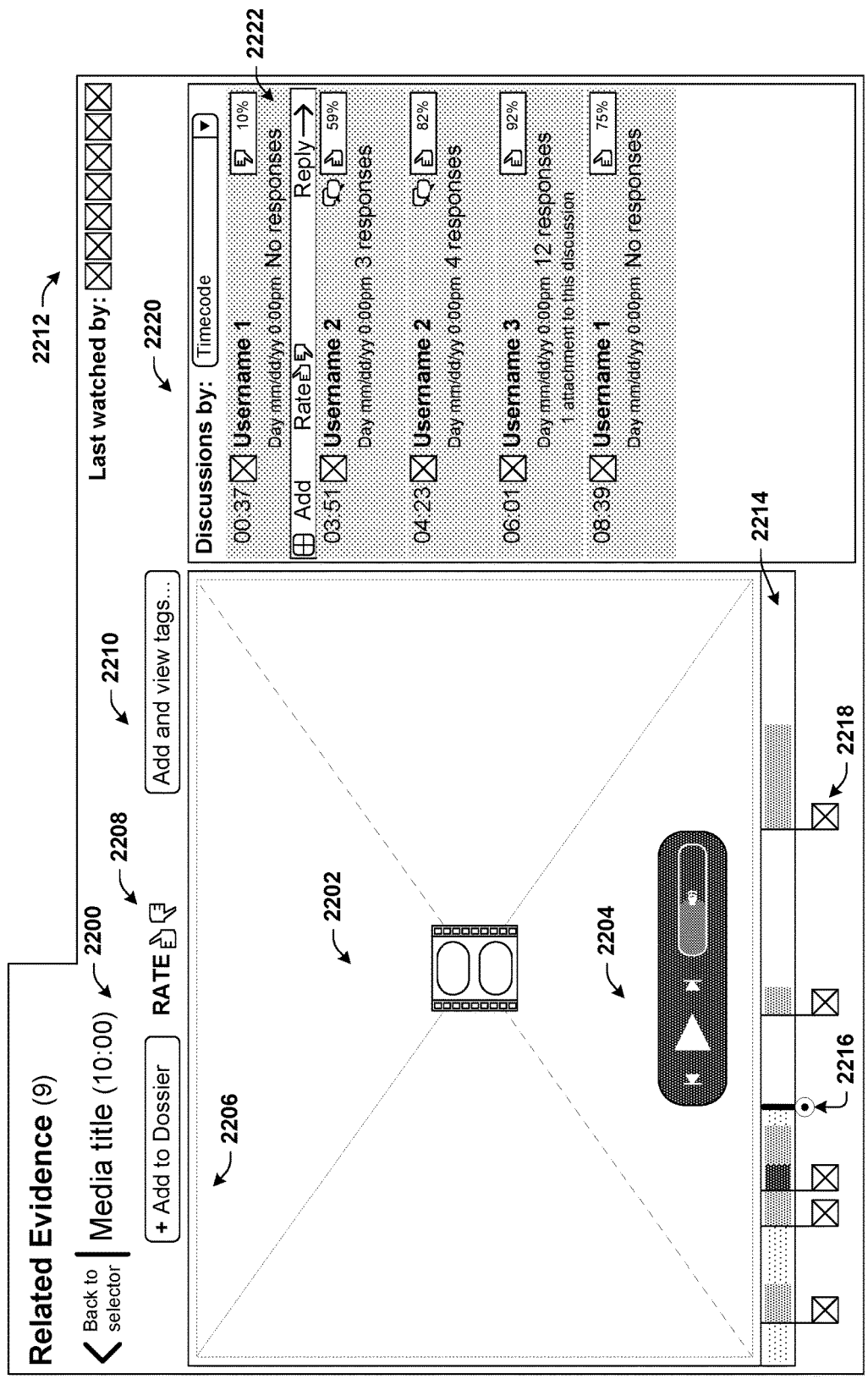
FIG. 22 is an exemplary, non-limiting illustration of a user interface of a network game within a gaming environment according to one or more embodiments.
Figure 23:
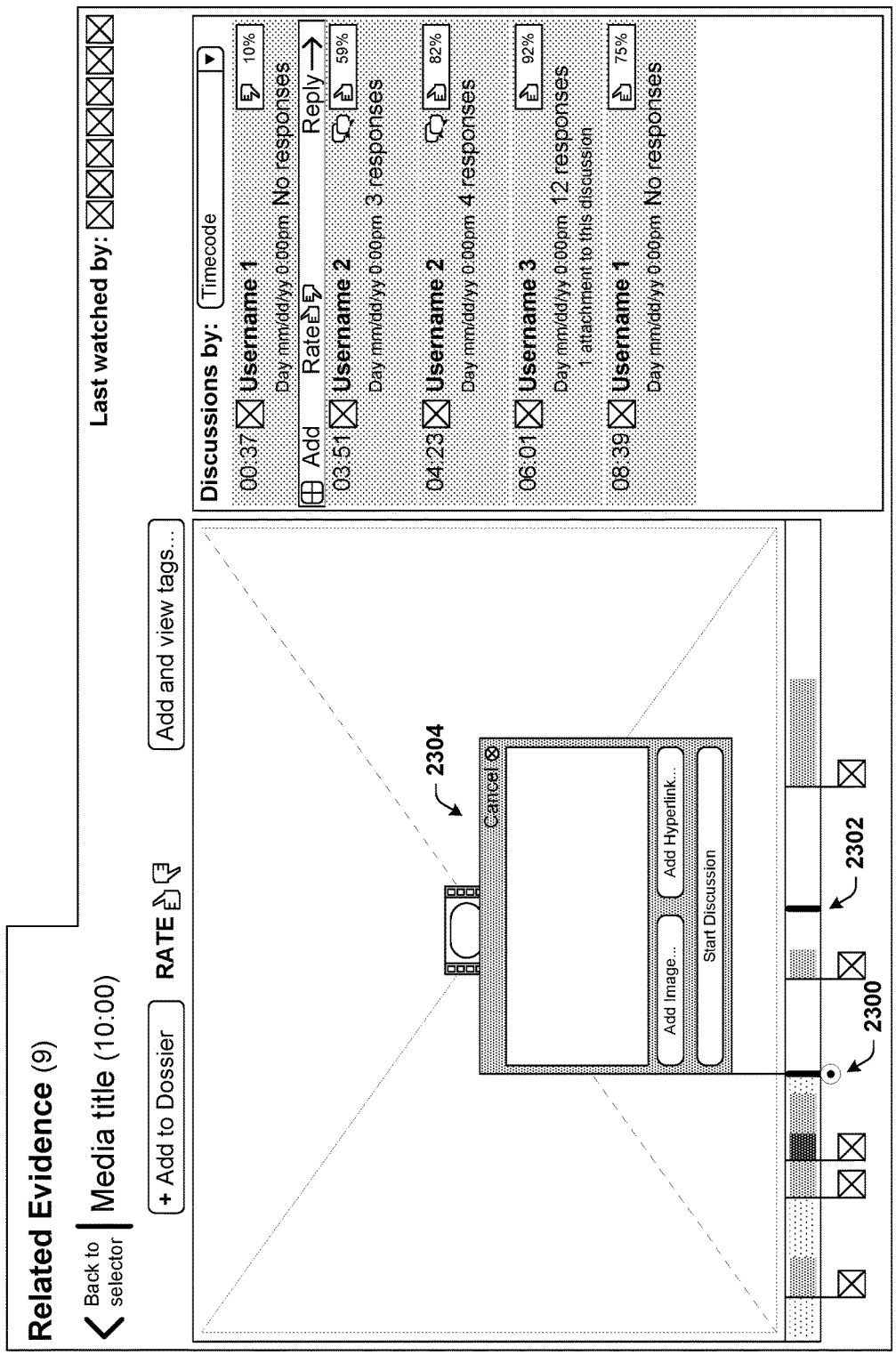
FIG. 23 is an exemplary, non-limiting illustration of a user interface of a network game within a gaming environment according to one or more embodiments.
Figure 24:
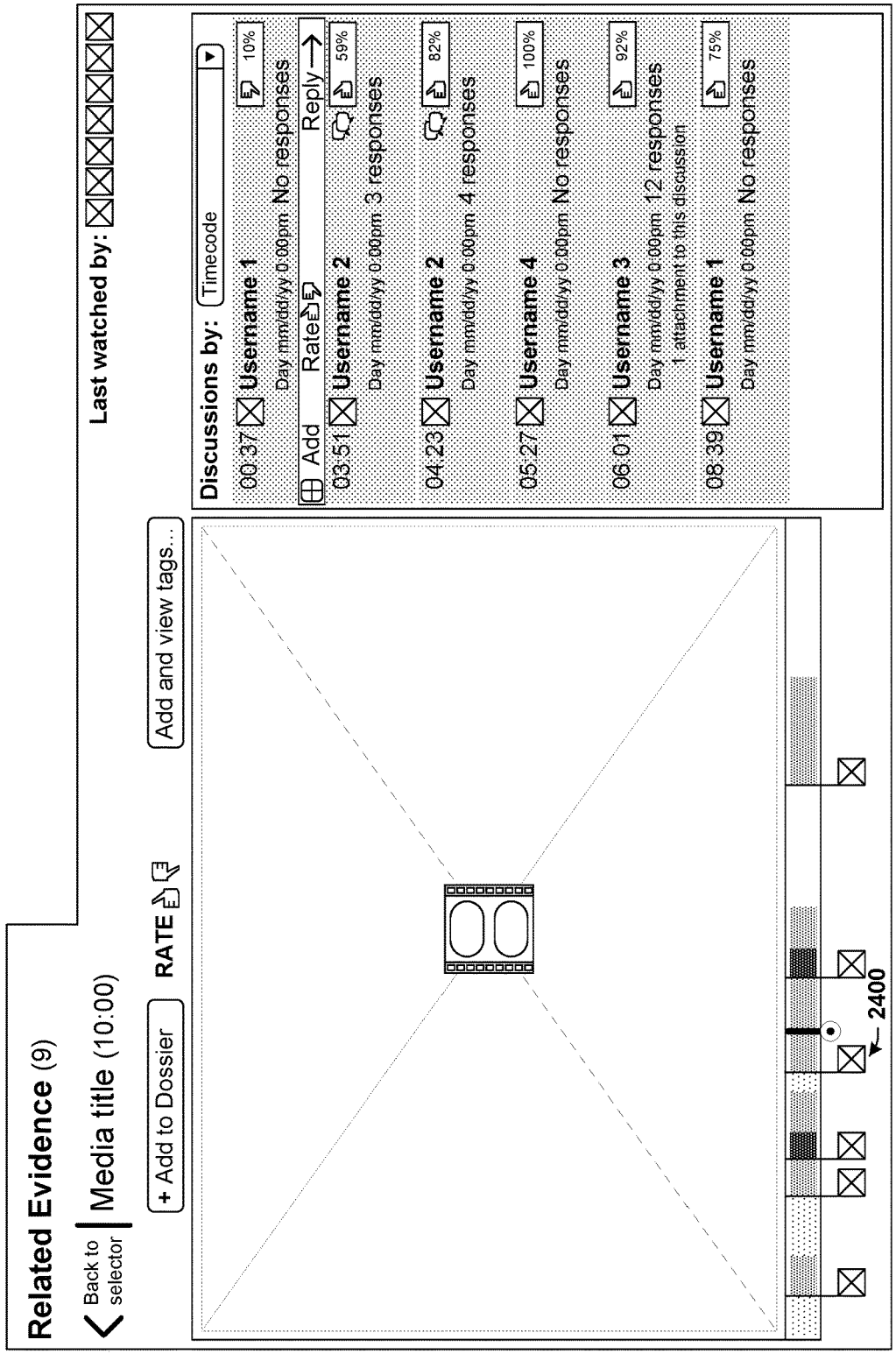
FIG. 24 is an exemplary, non-limiting illustration of a user interface of a network game within a gaming environment according to one or more embodiments.

FIGS. 22-24 are exemplary, non-limiting illustrations of user interfaces of a network game within a gaming environment according to one or more embodiment. These illustrations are provided to highlight and describe embodiments and features of the video viewing and tagging system and are not intended to limit the appended claims to the depictions described here. It is to be appreciated that alternative user interfaces can be devised to accomplish the functionality described herein and that such alternative interfaces are intended to be within the scope of the appended claims.

FIG. 22 is an exemplary, non-limiting illustration of a user interface of a network game within a gaming environment according to one or more embodiments. Particularly, FIG. 22 illustrates a display or panel of a video viewing and tagging system as described above. In one example, the display or panel illustrated in FIG. 22 can be incorporated into a user interface of a advisory services network gaming environment in a similar fashion to the integration of panel 700 of FIG. 7.

As shown in FIG. 22, at 2200, a title and time length of a video is shown. At 2212, avatars or thumbnails of the last few players to view the video are shown. The video can be presented in a video playback portion designated by 2202 and can be controlled by playback controls 2204. Playback controls 2204, as shown in FIG. 22, can include a play/pause toggle, a volume slider, a back control to skip back to a timestamp associated with a previous discussion, and a forward control to skip forward to a timestamp associate with a next discussion. The user interface depicted in FIG. 22 can provide various controls to manipulate the video in accordance with other features of the gaming environment. For instance, at 2206, a control is provided to add the video to a dossier. At 2208, controls are provided to rate the video (e.g., vote up or vote down) and, at 2210, a control is provided to view and add tags or labels to the video.

A video timeline 2214 is included to display a visual representation of video playback in terms of an overall length of the video. A playback head and start discussion button are illustrated at 2216. From the playback head, back to a beginning of timeline 2214 (e.g., leftmost side), the timeline 2214 can be shaded to show playback progress. As shown in FIG. 22, various video segments can be tagged and displayed. For example, one tag, indicated at 2218, can include a representation of a player avatar, an indicator that points to a starting position of the segment, and a shaded portion that extends to an ending position of the segment. As further shown in FIG. 22, multiple tags can overlap such the shaded portions, at the overlap, darken to indicate such overlap. In a specific, non-limiting example, each tag, such as the tag at 2218, correspond to a discussion thread, which can be listed in a discussion portion of the user interface at 2220. The discussion threads listed can be sorted according to timecode (e.g., the starting time relative to a start of the video), posting date (e.g., date of creation of the thread), rating, username, etc. Each discussion, such as discussion 2222, can specify a username and avatar of the player who created the discussion, a rating (e.g., percentage of total votes which are positive), a timestamp of the video portion relative to the timeline of the video, a creation date of the discussion, an indication of a number of responses, and various controls to up vote, down vote, reply, etc. In addition, when a particular player is logged on, an icon can appear on discussion started by that player, wherein the icon corresponds to a control to initiate a live messaging chat with the player.

FIG. 23 is an exemplary, non-limiting illustration of a user interface of a network game within a gaming environment according to one or more embodiments. FIG. 23 builds upon FIG. 22 and, accordingly, reference numerals from FIG. 22 are omitted for clarity. In an example, FIG. 23 illustrates user interface features associated with creating a new discussion based around a segment of a video. While a video is playing, a start discussion control 2300 can be activated to initiate an operation to create a new discussion thread. Upon activating the start discussion control 2300, which represents a start time of a segment, an end time can be specified by, for example, dragging from the start discussion control 2300 to a terminator 2302, clicking on timeline 2214 at a position corresponding to terminator 2302, entering a timestamp associated with terminator 2302, etc. Further, upon activating the start discussion control 2300, a pop-up 2304 is displayed to enable creation of the discussion. As shown in FIG. 23, a comment can be entered, images can be attached, or, hyperlinks can be attached. Further, a control is provided to start the discussion.

Turning to FIG. 24, an exemplary, non-limiting illustration of a user interface is depicted after a discussion is created via the user interface illustrated in FIG. 23. As shown in FIG. 24, a new tag, illustrated at 2400, is displayed on the user interface to indicate creation of the discussion. In addition, a new discussion thread 2402 is added to discussion portion 2200.

Exemplary Networked and Distributed Environments

One of ordinary skill in the art can appreciate that the various embodiments of video viewing and tagging system and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in video viewing and tagging mechanisms as described for various embodiments of the subject disclosure.

Figure 25:
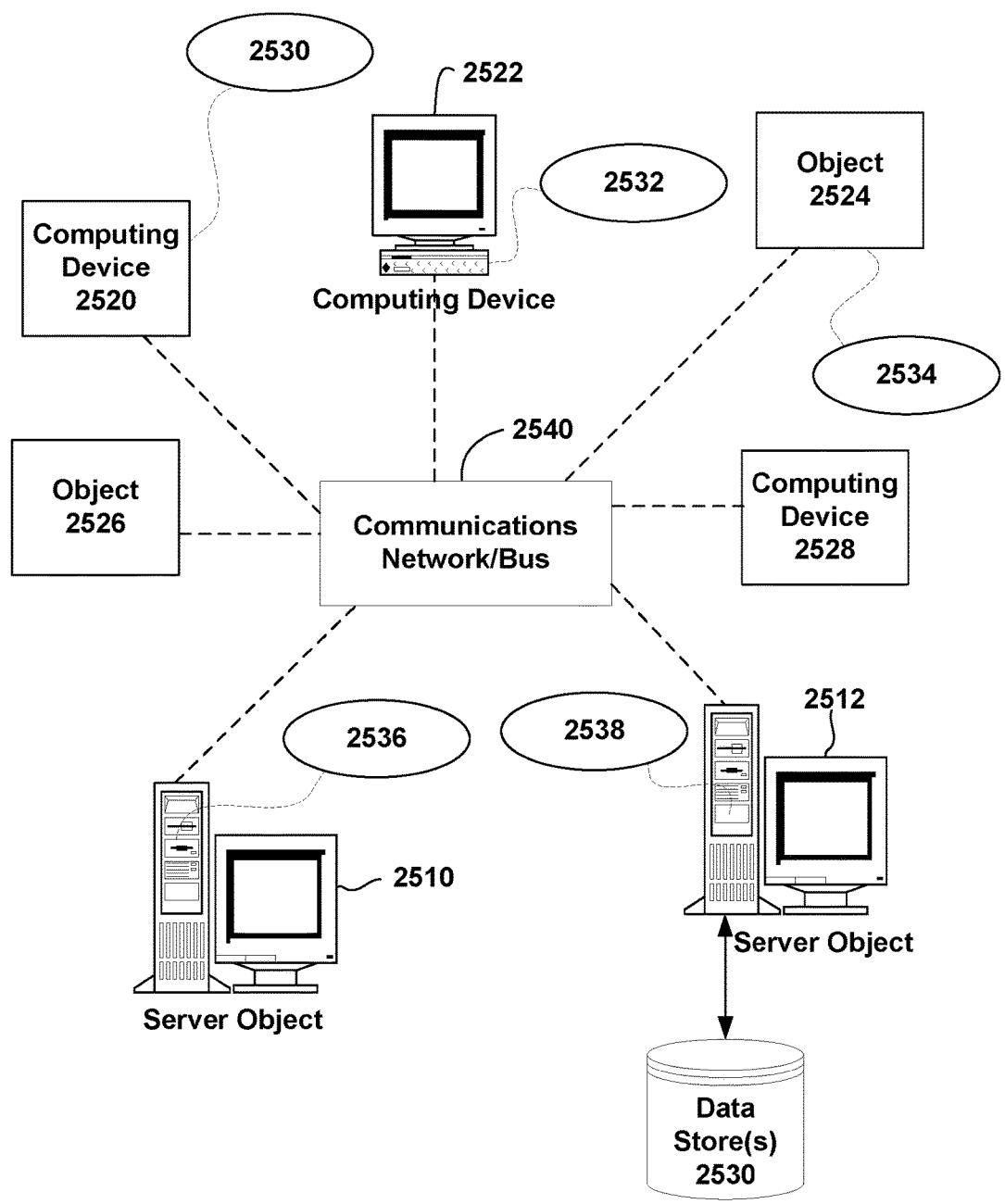
FIG. 25 is a block diagram representing exemplary non-limiting networked environments in which various embodiments described herein can be implemented.

FIG. 25 provides a schematic diagram of an exemplary networked or distributed computing environment. The distributed computing environment comprises computing objects 2510, 2512, etc. and computing objects or devices 2520, 2522, 2524, 2526, 2528, etc., which may include programs, methods, data stores, programmable logic, etc., as represented by applications 2530, 2532, 2534, 2536, 2538. It can be appreciated that computing objects 2510, 2512, etc. and computing objects or devices 2520, 2522, 2524, 2526, 2528, etc. may comprise different devices, such as personal digital assistants (PDAs), audio/video devices, mobile phones, MP3 players, personal computers, laptops, etc.

Each computing object 2510, 2512, etc. and computing objects or devices 2520, 2522, 2524, 2526, 2528, etc. can communicate with one or more other computing objects 2510, 2512, etc. and computing objects or devices 2520, 2522, 2524, 2526, 2528, etc. by way of the communications network 2540, either directly or indirectly. Even though illustrated as a single element in FIG. 25, communications network 2540 may comprise other computing objects and computing devices that provide services to the system of FIG. 25, and/or may represent multiple interconnected networks, which are not shown. Each computing object 2510, 2512, etc. or computing object or device 2520, 2522, 2524, 2526, 2528, etc. can also contain an application, such as applications 2530, 2532, 2534, 2536, 2538, that might make use of an API, or other object, software, firmware and/or hardware, suitable for communication with or implementation of the video tagging and viewing systems provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 25, as a non-limiting example, computing objects or devices 2520, 2522, 2524, 2526, 2528, etc. can be thought of as clients and computing objects 2510, 2512, etc. can be thought of as servers where computing objects 2510, 2512, etc., acting as servers provide data services, such as receiving data from client computing objects or devices 2520, 2522, 2524, 2526, 2528, etc., storing of data, processing of data, transmitting data to client computing objects or devices 2520, 2522, 2524, 2526, 2528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 2540 or bus is the Internet, for example, the computing objects 2510, 2512, etc. can be Web servers with which other computing objects or devices 2520, 2522, 2524, 2526, 2528, etc. communicate via any of a number of known protocols, such as the hypertext transfer protocol (HTTP). Computing objects 2510, 2512, etc. acting as servers may also serve as clients, e.g., computing objects or devices 2520, 2522, 2524, 2526, 2528, etc., as may be characteristic of a distributed computing environment.

Exemplary Computing Device

As mentioned, advantageously, the techniques described herein can be applied to any device where it is desirable to solve real-world problems in a computing system supporting the media viewing and tagging system described herein. It can be understood, therefore, that handheld, portable and other computing devices and computing objects of all kinds are contemplated for use in connection with the various embodiments, i.e., anywhere where players can access the media viewing and tagging system. Accordingly, the below general purpose remote computer described below in FIG. 26 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 26:
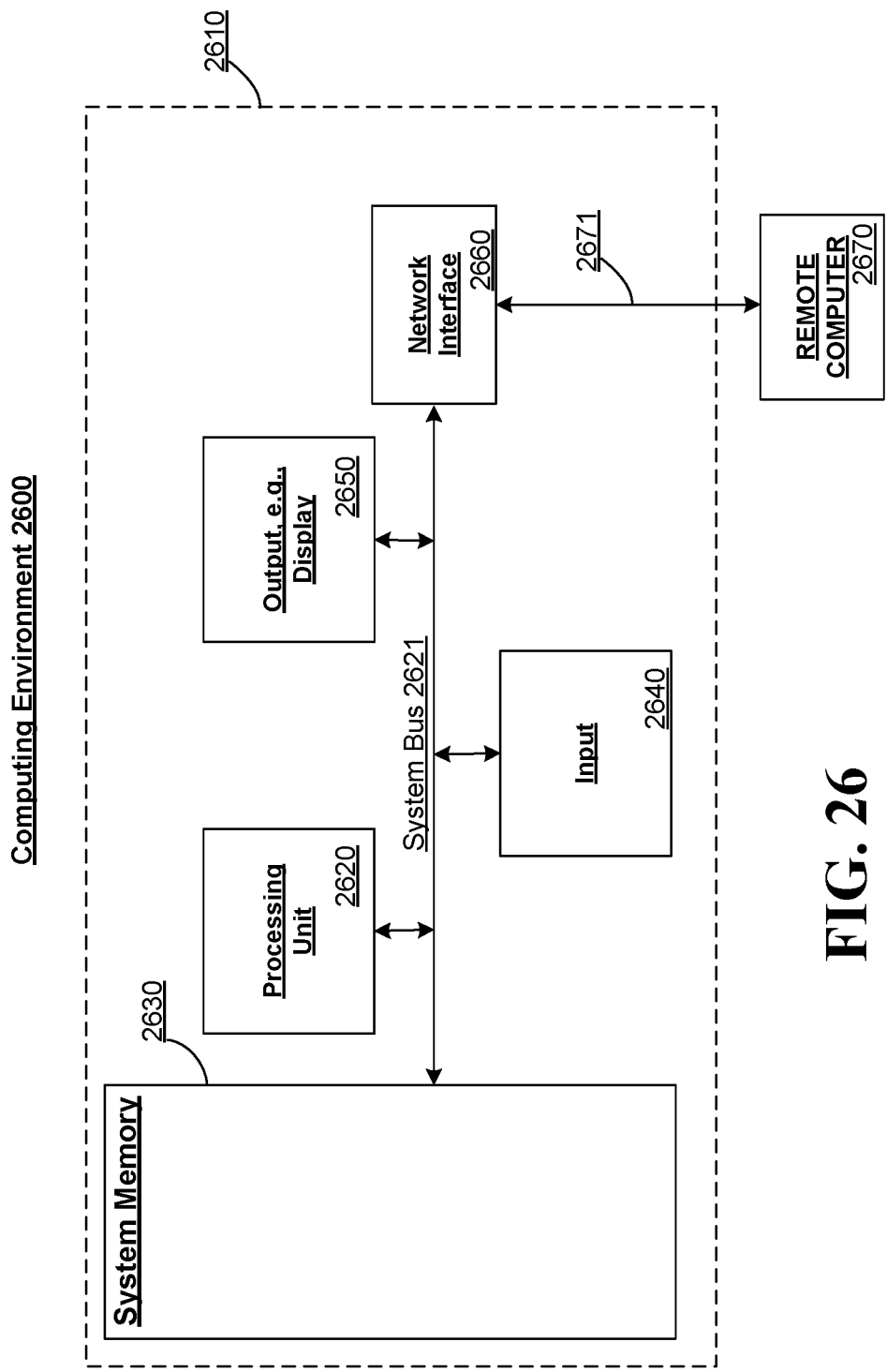
FIG. 26 is a block diagram representing an exemplary non-limiting computing system or operating environment in which one or more aspects of various embodiments described herein can be implemented.

FIG. 26 thus illustrates an example of a suitable computing system environment 2600 in which one or aspects of the embodiments described herein can be implemented, although as made clear above, the computing system environment 2600 is only one example of a suitable computing environment and is not intended to suggest any limitation as to scope of use or functionality. In addition, the computing system environment 2600 is not intended to be interpreted as having any dependency relating to any one or combination of components illustrated in the exemplary computing system environment 2600.

With reference to FIG. 26, an exemplary remote device for implementing one or more embodiments includes a general purpose computing device in the form of a computer 2610. Components of computer 2610 may include, but are not limited to, a processing unit 2620, a system memory 2630, and a system bus 2622 that couples various system components including the system memory to the processing unit 2620.

Computer 2610 typically includes a variety of computer readable media and can be any available media that can be accessed by computer 2610. The system memory 2630 may include computer storage media in the form of volatile and/or nonvolatile memory such as read only memory (ROM) and/or random access memory (RAM). By way of example, and not limitation, system memory 2630 may also include an operating system, application programs, other program modules, and program data. According to a further example, computer 2610 can also include a variety of other media (not shown), which can include, without limitation, RAM, ROM, EEPROM, flash memory or other memory technology, compact disk (CD)-ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 2610 through input devices 2640. A monitor or other type of display device is also connected to the system bus 2622 via an interface, such as output interface 2650. In addition to a monitor, computers can also include other peripheral output devices such as speakers and a printer, which may be connected through output interface 2650.

The computer 2610 may operate in a networked or distributed environment using logical connections to one or more other remote computers, such as remote computer 2670. The remote computer 2670 may be a personal computer, a server, a router, a network PC, a peer device or other common network node, or any other remote media consumption or transmission device, and may include any or all of the elements described above relative to the computer 2610. The logical connections depicted in FIG. 26 include a network 2672, such as a local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to implement a game for real-world applications.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A non-transitory computer-readable medium comprising computer-executable instructions that, in response to execution by a computing system, cause the computing system to perform operations, comprising:
   managing execution of a game, via a game engine associated with an instance of the game, wherein a variety of players participate in the game to solve a real-world problem of an organization based on evidence input to the game, wherein the players include experts in subject matter of the real-world problem, wherein the players are provided with the real-world problem of the organization, and wherein the evidence includes case studies conveying knowledge about the organization and the real-world problem to the players;

maintaining display content of an interface and receiving player input from the interface via an interface module;

storing, at an evidence store, a collection of data related to the real-world problem, wherein the collection of data includes media files conveying ethnographic information received from the organizer; and storing, in a discussion store, discussion threads comprising player comments, wherein the game engine further comprises a video viewing and tagging subsystem to retrieve a first media file from the evidence store, tag a portion of the first media file, and create a new discussion thread that pertains to the portion of the first media file tagged; and wherein the video viewing and tagging subsystem comprises a linking module to associate the new discussion thread with the portion of the first media file, wherein the linking module generates a metadata entry that specifies a relationship between the new discussion thread and the portion of the first media file, wherein the linking module generates the metadata entry based on a first identifier corresponding to the new discussion thread and a second identifier corresponding to the first media file, wherein the metadata entry correlates the first identifier and the second identifier, and wherein the metadata entry, through inclusion of information identifying the first media file, further ties the new discussion thread specifically to the portion of the first media file, wherein the metadata entry further includes information that specifies the portion of the first media file as a function of an entirety of the first media file, and wherein the video viewing and tagging subsystem generates networks of interlinked media files and player comments by linking discussion threads with portions of the media files to provide a solution to the real-world problem.

2. The non-transitory computer-readable medium of claim 1, wherein the video viewing and tagging subsystem retrieves a second media file from the evidence store, identifies a pre-existing discussion thread stored in the discussion store and presented on the interface, and associates the second media file with the pre-existing discussion thread.

3. The non-transitory computer-readable medium of claim 1, wherein a metadata store stores metadata that associates discussion threads stored in the discussion store to media files stored in the evidence store.

4. The non-transitory computer-readable medium of claim 3, wherein the game engine further includes a tagging module to associate a label with the portion of the first media file.

5. The non-transitory computer-readable medium of claim 1, wherein the game engine further includes an interface content module to generate interface content, maintained by the interface module, based on media files stored in the evidence store and respective discussion threads respectively associated with the media files.

6. The computer-readable medium of claim 1, wherein the game engine processes player input forwarded to the game by the interface module.

7. The non-transitory computer-readable medium of claim 6, wherein the game engine generates output provided to the interface module, which is subsequently presented on the interface.

8. The non-transitory computer-readable medium of claim 1, wherein the game engine processes player input forwarded to the game by the interface module.

9. The non-transitory computer-readable medium of claim 8, wherein the game engine generates output provided to the interface module, which is subsequently presented on the interface.

10. A gaming platform of an advisory services network, comprising:

a game engine to manage execution of a game, wherein a variety of players participate in the game to solve a real-world problem of an organization based on evidence input to the game, wherein the players include experts in subject matter of the real-world problem, wherein the players are provided with the real-world problem of the organization, and wherein the evidence includes case studies conveying knowledge about the organization and the real-world problem to the players;

an interlace module to maintain display content on an interface and to receive player input from the interface; and a plurality of data storage locations comprising:

an evidence store to retain a collection of data related to the real-world problem, wherein the collection of data includes media files conveying ethnographic information received from the organization; and a discussion store to store discussion threads comprising player comments, wherein the game engine further comprises a video viewing and tagging subsystem to retrieve a first media file from the evidence store, tag a portion of the first media file, and create a new discussion thread that pertains to the portion of the first media file tagged; and wherein the video viewing and tagging subsystem comprises a linking module to associate the new discussion thread with the portion of the first media file, wherein the linking module generates a metadata entry that specifies a relationship between the new discussion thread and the portion of the first media file, wherein the linking module generates the metadata entry based on a first identifier corresponding to the new discussion thread and a second identifier corresponding to the first media file, wherein the metadata entry correlates the first identifier and the second identifier, and wherein the metadata entry, through inclusion of information identifying the first media file, further ties the new discussion thread specifically to the portion of the first media file, wherein the metadata entry further includes information that specifies the portion of the first media file as a function of an entirety of the first media file, and wherein the video viewing and tagging subsystem generates networks of interlinked media files and player comments by linking discussion threads with portions of the media files to provide a solution to the real-world problem.

11. The gaming platform of claim 10, wherein the video viewing and tagging subsystem retrieves a second media file from the evidence store, identifies a pre-existing discussion thread stored in the discussion store and presented on the interface, and associates the second media file with the pre-existing discussion thread.

12. The gaming platform of claim 10, wherein the plurality of data storage locations further comprises a metadata store to store metadata that associates discussion threads stored in the discussion store to media files stored in the evidence store.

13. The gaming platform of claim 12, wherein the game engine further includes a tagging module configured to associate a label with the portion of the first media file.

14. The gaming platform of claim 10, wherein the game engine further includes an interface content module to generate interface content, maintained by the interface module, based on media files stored in the evidence store and respective discussion threads respectively associated with the media files.

\* \* \* \* \*